(12) United States Patent
Andrade et al.

(10) Patent No.: US 10,185,793 B2
(45) Date of Patent: Jan. 22, 2019

(54) CONDITIONAL-BASED DURATION LOGIC

(71) Applicant: The MathWorks, Inc., Natick, MA (US)

(72) Inventors: David B. Andrade, Brookline, MA (US); Srinath Avadhanula, Sudbury, MA (US); Yit Phang Khoo, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 73 days.

(21) Appl. No.: 15/061,556

(22) Filed: Mar. 4, 2016

(65) Prior Publication Data
US 2016/0259874 A1    Sep. 8, 2016

Related U.S. Application Data

(60) Provisional application No. 62/128,766, filed on Mar. 5, 2015.

(51) Int. Cl.
*G06F 17/50* (2006.01)
*G06F 9/448* (2018.01)
*G06F 8/34* (2018.01)

(52) U.S. Cl.
CPC ............ *G06F 17/5022* (2013.01); *G06F 8/34* (2013.01); *G06F 9/4498* (2018.02); *G06F 17/5009* (2013.01); *G06F 17/5036* (2013.01)

(58) Field of Classification Search
CPC ............... G06F 17/5009; G06F 11/008; G06F 17/5022; G06F 17/5036; G06F 8/34; G06F 8/35; G06F 9/444
See application file for complete search history.

(56) References Cited

U.S. PATENT DOCUMENTS

| 4,562,427 | A | * | 12/1985 | Ecton | ................... | G05B 19/045 |
| | | | | | | 326/46 |
| 5,313,615 | A | * | 5/1994 | Newman | ............. | G06F 17/5009 |
| | | | | | | 703/13 |

(Continued)

OTHER PUBLICATIONS

"Notification of Transmittal of the International Search Report and the Written Opinion of the International Searching Authority, or the Declaration," International Filing Date: Mar. 4, 2016, International Application No. PCT/US2016/020959, Applicant: The Mathworks, Inc., dated Jun. 8, 2016, pp. 1-11.

(Continued)

*Primary Examiner* — Helen Rossoshek
(74) *Attorney, Agent, or Firm* — Cesari & McKenna, LLP.; Michael R. Reinemann

(57) ABSTRACT

A model of a state machine may be created in a modeling environment, and the model may be executed over a simulation time. A duration operator may be defined within the model. The duration operator may include as an input argument, a conditional expression that may evaluate to True or False. During execution, the modeling environment may define a plurality of time steps over the course of the model's simulation time. The conditional expression of the duration operator may be evaluated at the time steps. When the conditional expression evaluates to True, the modeling environment may begin tracking elapsed simulation time, and may continue to track elapsed simulation time while the conditional expression remains True. The value of elapsed simulation time may be made available to other portions of the model.

31 Claims, 25 Drawing Sheets

(56) References Cited

U.S. PATENT DOCUMENTS

| | | | | |
|---|---|---|---|---|
| 5,456,604 A * | 10/1995 | Olmsted | G09B 9/048 | 434/29 |
| 5,483,470 A * | 1/1996 | Alur | G06F 17/504 | 716/108 |
| 5,485,600 A * | 1/1996 | Joseph | G06F 8/34 | 345/473 |
| 5,606,517 A * | 2/1997 | Traub | G06F 17/5018 | 703/9 |
| 5,905,883 A * | 5/1999 | Kasuya | G06F 17/5022 | 703/17 |
| 5,953,519 A * | 9/1999 | Fura | G06F 17/5022 | 716/103 |
| 5,997,167 A * | 12/1999 | Crater | G05B 19/41835 | 700/79 |
| 6,502,102 B1 * | 12/2002 | Haswell | G06F 11/3664 | |
| 6,594,803 B1 * | 7/2003 | Weber | G06F 17/5022 | 716/106 |
| 6,675,138 B1 * | 1/2004 | Hollander | G01R 31/31707 | 703/13 |
| 6,883,147 B1 * | 4/2005 | Ballagh | G06F 17/5045 | 716/102 |
| 6,985,840 B1 * | 1/2006 | Hsu | G01R 31/3181 | 703/14 |
| 7,020,850 B2 * | 3/2006 | Raghavan | G06F 8/34 | 703/23 |
| 7,085,700 B2 * | 8/2006 | O'Riordan | G06F 17/5036 | 703/14 |
| 7,085,702 B1 * | 8/2006 | Hwang | G06F 17/5022 | 326/93 |
| 7,099,812 B2 * | 8/2006 | Boehm | G06F 17/10 | 703/17 |
| 7,257,524 B2 * | 8/2007 | Schilp | G06F 17/5022 | 703/14 |
| 7,257,802 B2 * | 8/2007 | Daw | G01R 31/318314 | 703/14 |
| 7,275,237 B1 * | 9/2007 | Schneider | G06F 8/10 | 715/736 |
| 7,346,403 B2 * | 3/2008 | Tanaka | G05B 11/42 | 700/28 |
| 7,346,484 B2 * | 3/2008 | Boehm | G06F 17/5022 | 703/16 |
| 7,433,808 B1 | 10/2008 | Raghavan et al. | | |
| 7,624,001 B2 * | 11/2009 | Sasaki | G03G 15/1645 | 365/201 |
| 7,761,828 B2 * | 7/2010 | Miczo | G06F 17/5022 | 703/13 |
| 7,783,370 B2 * | 8/2010 | Nixon | G05B 19/0426 | 700/17 |
| 7,941,303 B1 | 5/2011 | Raghavan et al. | | |
| 7,949,501 B1 * | 5/2011 | Iravani | G05B 19/41885 | 703/6 |
| 8,046,708 B1 * | 10/2011 | Aldrich | G06F 17/5022 | 714/46 |
| 8,131,523 B1 * | 3/2012 | Yunt | G06F 8/34 | 703/2 |
| 8,156,457 B2 * | 4/2012 | Basile | G06F 17/5022 | 703/14 |
| 8,185,892 B2 * | 5/2012 | Lucas | G05B 19/0426 | 717/105 |
| 8,190,553 B2 * | 5/2012 | Routt | B82Y 10/00 | 706/62 |
| 8,234,630 B2 * | 7/2012 | Raghavan | G06F 9/449 | 717/125 |
| 8,271,369 B2 * | 9/2012 | Gilmore | G06Q 10/06 | 705/35 |
| 8,296,740 B2 * | 10/2012 | Roesner | G06F 11/3636 | 717/128 |
| 8,332,202 B2 * | 12/2012 | Hirose | G06F 17/5036 | 700/31 |
| 8,387,000 B2 * | 2/2013 | Avadhanula | G06F 8/34 | 717/105 |
| 8,418,097 B2 * | 4/2013 | Raghavan | G06F 17/5009 | 716/105 |
| 8,464,188 B1 * | 6/2013 | Raghavan | G06F 17/5009 | 716/100 |
| 8,949,084 B2 * | 2/2015 | Baym | G06F 17/5009 | 703/2 |
| 8,954,917 B1 * | 2/2015 | Shu | G06F 17/5036 | 716/100 |
| 9,104,805 B1 * | 8/2015 | Yunt | G06F 8/34 | |
| 9,547,481 B2 * | 1/2017 | Avadhanula | G06F 8/35 | |
| 2004/0078674 A1 * | 4/2004 | Raimi | G06F 17/504 | 714/33 |
| 2004/0260513 A1 * | 12/2004 | Fitzpatrick | G06Q 10/06 | 702/182 |
| 2005/0081104 A1 * | 4/2005 | Nikolik | G06F 11/3676 | 714/38.13 |
| 2007/0132779 A1 * | 6/2007 | Gilbert | G05B 19/0426 | 345/619 |
| 2007/0299642 A1 * | 12/2007 | Kondo | G06F 17/5009 | 703/6 |
| 2009/0013307 A1 | 1/2009 | Raghavan et al. | | |
| 2009/0044171 A1 | 2/2009 | Avadhanula | | |
| 2010/0031212 A1 * | 2/2010 | Dong | G06F 17/50 | 716/100 |
| 2010/0070257 A1 * | 3/2010 | Mylavarapu | G06F 17/5022 | 703/16 |
| 2010/0162156 A1 * | 6/2010 | Tolone | G06F 17/5004 | 715/771 |
| 2013/0145345 A1 * | 6/2013 | Avadhanula | G06F 8/20 | 717/105 |
| 2014/0046647 A1 * | 2/2014 | Tsai | G06F 17/5022 | 703/14 |
| 2014/0278324 A1 * | 9/2014 | Bates | A61B 5/04021 | 703/11 |
| 2014/0359567 A1 * | 12/2014 | Avadhanula | G06F 8/35 | 717/109 |
| 2016/0203070 A1 * | 7/2016 | Malani | G06F 11/3457 | 703/21 |
| 2016/0210332 A1 * | 7/2016 | Milton | G06F 17/30551 | |
| 2016/0217371 A1 * | 7/2016 | Leithiser | G06Q 10/04 | |

OTHER PUBLICATIONS

"Simulink® User's Guide: R2014b," The MathWorks, Inc., Oct. 2014, pp. 1-3158.

"Stateflow®: User's Guide," R2014b, The Math Works, Inc., Oct. 2014, pp. 1-1432.

* cited by examiner

```
1    bool condIsTrue = in1 + in2 > 0;
2    if( !(condIsTrue && condWasTrueLastTime) ) {
3            durationRefTime = getCurrentTime();
4    }
5    condWasTrueLastTime = condIsTrue;
6    y = getCurrentTime() – durationRefTime;
```

FIG. 7

```
1    if(condIsTrue && !condWasTrueLastTime) {
2            // zero crossing detected
3    }else if(!condIsTrue && condWasTrueLastTime) {
4            // zero crossing detected
5    }
```

FIG. 9

```
1    bool condIsTrue = in1 + in2 > 0;
2    if(!condIsTrue) {
3            durationRefTime = NaN;
4    }else if(condIsTrue && isNaN(durationRefTime))
5            durationRefTime = getCurrentTime();
6    }
7    y = isNaN(durationRefTime) ?
8        0 : getCurrentTime() – durationRefTime;
```

FIG. 10

```
1    if durationRefTime contains a valid number, then
2            duration = getCurrentTime() – durationRefTime;
3    else
4            duration = 0
5    end
```

*FIG. 11*

```
1    bool condIsTrue = in1 + in2 > 0;
2    if(!condIsTrue){
3            durationRefTime = 1;
4    }else if(condIsTrue && isNan(durationRefTime))
5            durationRefTime = getCurrentTime() * 2;
6    }
7    y = durationRefTime == 1 ?
8         0 : getCurrentTime() – (durationRefTime / 2);
```

*FIG. 12*

```
1   define JUST_UPDATE false;
2   #define FORCE_RESET true;
3
4
5   void execute_chart() {
6     switch( currentActiveState ) {
7     case IN_A:                                                    ⎯1502
8       // Before entering State 'A':
9       update_duration1(JUST_UPDATE); // Update state for "duration( input1 >= 0 )"    ⎯1504
10      update_duration2(JUST_UPDATE); // Update state for "duration( input2 >= 0 )"
11      update_duration3(JUST_UPDATE); // Update state for duration( input1 > 0 )"    ⎯1506
12      // Check outgoing Transitions from State 'A'
13      if(getCurrentTime() - duration3_refTime > 5) { // Check whether condition for transition is satisfied
14        // Take transition to State 'B'
15        // Before entering State 'B'                       1510⎯         ⎯1508
16        update_duration4(FORCE_RESET); // Reset the condWasTrue variable for "duration( true )"
17        update_duration5(FORCE_RESET); // Reset the condWasTrue variable for "duration( input1 <= 0 )"
18        // Upon entering State 'B'                                            ⎯1512
19        currentActiveState = IN_B;
20        break;
21      }else{
22        // While within State 'A'
23        during_state_A();
24      }
25    case IN_B:
26      // Pre-during of State 'B':                          ⎯1514
27      update_duration4(JUST_UPDATE); // Update state for "duration( true )"
28      update_duration5(JUST_UPDATE); // Update state for "duration( input1 <= 0 )"    ⎯1516
29      if(gotoC == true) {
30        // Execute actions on the transition
31        // Transition action: { y = duration(input1 <= 0); }
32        y = getCurrentTime() - duration5_refTime;    ⎯1518
33        // Take the transition to state 'C'
34        // Pre-entry to State 'C'
35        update_duration6(FORCE_RESET); // Reset state for "duration( true )"    ⎯1520
36        break;
37      }else{
38        // During action of State 'B'
39        // Evaluate expression
40        activeTime = getCurrentTime() - duration4_refTime;    ⎯1522
41      }
42    case IN_C:
43      // Pre-During action of State 'C'
44      update_duration6(JUST_UPDATE); // Update the state for "duration( true )"    ⎯1524
45      // Exit action of State 'C'
46      activeTime = getCurrentTime() - duration6_refTime; // activeTime = duration(true);
47    default:
48
```

*FIG. 15A*

```
49        // Before entering State 'A'
50        update_duration1(FORCE_RESET); // Reset state for duration( input1 >= 0 )
51        update_duration2(FORCE_RESET); // Reset state for  duration( input2 >= 0 )
52        update_duration3(FORCE_RESET); // Reset state for duration( input1 > 0 )
53        // Entry of State 'A'
54        enter_state_A();
55      };
56    }
57
58    void enter_state_A() {
59      currentActiveState = IN_A;
60      if(measureInput1 == true) {
61        y = getCurrentTime() – duration1_refTime;  // y = duration( input2 <= 0 );
62      }else{
63        y = getCurrentTime() – duration2_refTime;  // y = duration( input2 >= 0 );
64      }
65    }
66
67    void update_duration1(bool reset) {
68      static bool condWasTrue = false;
69      if(reset) {
70        condWasTrue = false;
71      }
72      // update
73      bool condIsTrue = input1 >= 0;
74      if(!(condIsTrue && condWasTrue)) {
75        duration1_refTime = getCurrentTime();
76      }
77    }
78
79
80
81    /* Not shown explicitly are:
82     *
83     *    during_state_A();
84     *    update_durationN(bool RESET);
85     *
86     *
87     */
88
```

*FIG. 15B*

CONDITIONAL-BASED DURATION LOGIC

CROSS-REFERENCE TO RELATED APPLICATIONS

This application claims the benefit of Provisional Patent Application Ser. No. 62/128,766, filed Mar. 5, 2015, for Conditional-Based Duration Logic, which application is hereby incorporated by reference in its entirety.

BRIEF DESCRIPTION OF THE DRAWINGS

The present disclosure refers to the accompanying drawings, of which:

FIG. 7 is a schematic illustration of code;

FIG. 9 is a schematic illustration of code;

FIG. 10 is a schematic illustration of code;

FIG. 11 is a schematic illustration of code;

FIG. 12 is a schematic illustration of code;

FIGS. 15A and 15B are partial views of code generated for the model of FIG. 14 in accordance with an embodiment;

DETAILED DESCRIPTION OF ILLUSTRATIVE EMBODIMENTS

Figure 1:
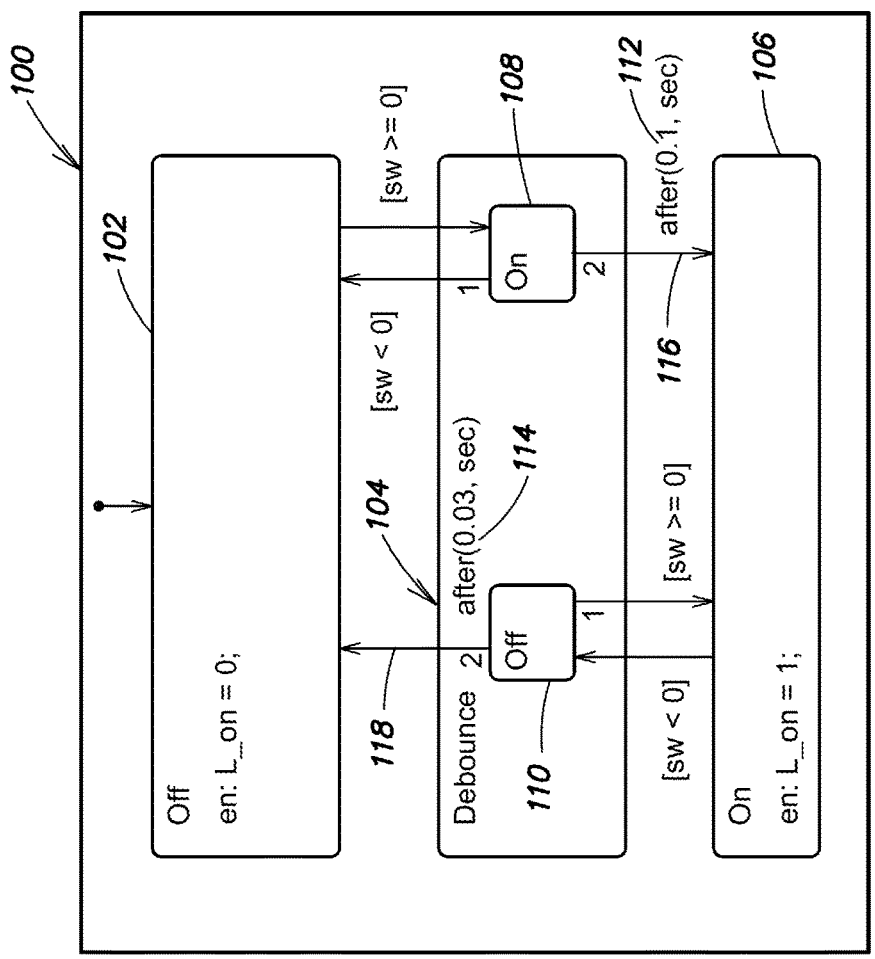
FIG. 1 is a schematic illustration of a prior art version of an executable model.

Computer-based modeling environments are often used to design systems, such as control systems, communications systems, factory automation systems, etc. A user may construct a computer model of a system being developed within a modeling environment. A graphical model may include a plurality of model elements such as blocks, icons, states, objects, etc., that have predetermined and/or custom defined functionality. Relationships may be established among model elements, and these relationships may appear visually in the model, for example, as arrows, wires, etc. The model may have executable semantics, and may be executed by the modeling environment. For example, the modeling environment may generate executable instructions based on the graphically defined model.

A user may simulate operation of the system being designed by directing the modeling environment to execute, e.g., run, a model using sample input data. The user may evaluate whether the model operates in the intended manner. For example, the user may determine whether the model, when executed, generates expected output values. If the model fails to generate the expected output values or to meet other design specifications, the user may revise the model. When the user is satisfied that the model accurately represents the operation of a system being designed and/or meets the design specifications, a code generator may generate code, such as source code, for the model. The code generator may be part of the modeling environment or it may be a separate add-on tool or module. The generated code, which may be run outside of the modeling environment, may be loaded onto a target hardware platform and run. For example, the code may be compiled and executed by a microprocessor, a digital signal processor (DSP), or other processing logic of a physical, deployed system. In some embodiments, the generated code may be in the form of a hardware description language (HDL) and may be used to synthesize one or more programmable hardware elements, such as a Field Programmable Gate Array (FPGA).

Modeling environments may support the creation of models having different execution domains, such as dynamic or time-based models, state-based models, event-based models, differential equation based models, and data/control flow models, among others. The results computed during simulation of a dynamic model change over time. For example, time-based relationships may be defined using signals and state variables, and the solution of the model may be obtained by evaluating these relationships over some period of time, e.g., the model's simulation time. The model may be solved repeatedly over the simulation time at intervals called time steps. The modeling environment may specify a default simulation time, for example from zero to ten seconds. Simulation time differs from actual clock time. For example, even though a model's execution may be simulated from zero to ten seconds, it may take a small fraction of that in terms of actual clock time to execute the model. A modeling environment may include a model compiler, which may include or have access to one or more solvers, that generates a set of equations for the relationships between a model's signals and state variables. During model execution, a solver, which may be the same solver used in the generation of equations or may be another solver, solves these equations. The solver may determine the particular time steps, which may also be referred to as sample times, during which equations associated with the model's elements may be executed. An example of a time-based block diagram modeling environment is the Simulink® model-based design environment from The MathWorks, Inc. of Natick, Mass.

A state-based model, which may also be referred to as a statechart, may be represented graphically as a connected graph having nodes that represent states or junctions connected by edges representing transitions. The state-based model may be run within a time-based execution domain. At any given time step, one or more of the state-based model's states may be active. Actions defined within the model may be triggered in response to the occurrence of events, which may also be defined within the model. Actions also may be predicated on the evaluation of a condition. An example of a state-based modeling environment is the Stateflow® programming system also from The MathWorks, Inc.

The present disclosure relates to an operator that may be used in a model, such as a state-based model, having executable semantics. The operator may be used to determine the duration in terms of simulation time of a condition of the model. Use of the operator may result in a more efficient presentation and more efficient execution of a model, for example by a processor of a data processing device.

A state-based portion of an executable model may include a plurality of graphical and nongraphical elements. For example, a state-based portion may include one or more state elements that describe an operating mode of a reactive system. State elements may include one or more substate elements, thereby establishing hierarchy. A state element that includes a substate element may be referred to as a superstate element. The substates of a superstate may be exclusive (OR) states, or parallel (AND) states. State elements may be implemented graphically as rectangles with rounded corners. State actions may be specified textually for a given state according to an action language, and a state may support multiple different types of actions. For example, an entry type of action, which may be identified by using a label, such as 'entry' or 'en', may be executed when a state becomes active, e.g., is entered. A during type of action, which may be identified by using a label, such as 'during' or 'du', may be executed while a state is active. An exit type of action, which may be identified by using a label, such as 'exit' or 'ex', may be executed when a state becomes inactive, e.g., is exited.

A state-based portion may include transitions that represent passage of the system from a first (source) state to a second (destination) state. Junctions may divide a transition into segments. A transition may include a label consisting of an event, a condition, a condition action, and/or a transition action. Transitions may be implemented graphically as arrows, and labels may be implemented textually according to the syntax and semantics of an action language.

Execution of a state-based portion may go through several stages, such as an inactive stage in which the portion has no active states, an active stage in which the portion has one or more active states, and a sleeping stage in which the portion has active states, but no events to process. A state-based portion may enter the active stage from the inactive stage in response to an event broadcast by the time-based portion of the model or from another state-based portion. Exemplary events include edge-triggered events associated with signals, and function-call events. An edge-triggered event may be a rising edge trigger, e.g., when a control signal changes from zero or a negative value to a positive value, a falling edge trigger, e.g., when a control signal changes from zero or a positive value to a negative value, or either rising or falling. The state-based portion may first execute its set of default flow graphs in response to the triggering event, which may cause entry into a state of the state-based portion. A flow graph may model decision and iterative loop logic graphically through connective junctions and transitions. The junctions may provide branches between alternative transition paths. A state-based portion may execute once for each active input event. After completing all possible phases of execution, a state-based portion may go back to sleep.

As an example, many systems, including control systems and signal processing systems, include switches. When a physical switch opens and closes, the switch contacts can sometimes bounce off each other before the switch completely transitions to an 'on' or 'off' state. This bouncing action can produce transient signals that do not represent a true change of state of the switch. The transient signals may cause a controller or other component of the system to be overworked. Accordingly, when modeling a system having a switch, a user may include a debouncer unit in the model to deal with transient signals that may be produced by the switch.

FIG. 1 is a schematic illustration of an executable graphical model 100 of a debouncer algorithm in accordance with the prior art. The graphical model 100 receives an input signal (sw), for example from a switch, and produces an output signal (L_on) that represents a debounced switch signal. The model 100 may include one or more state charts having states that simulate one or more finite state machines. For example, the model 100 may include an Off state 102, a Debounce state 104, and an On state 106. The Debounce state 104 includes an On substate 108 and an Off substate 110. The model 100 may transition between the Off and On states 102 and 106 in response to the value of the input signal (sw). When the input signal (sw) is less than 0, the model 100 may move to (or remains in) in the Off state 102, and the output signal (L_on) is 0. When the input signal (sw) is equal to or greater than 0, the model 100 may move to (or remain in) the On state 106, and the output signal (L_on) may be 1. The Debounce state 104 may keep the model 100 from moving between the On and Off states 102 and 106 in response to transient changes in the input signal (sw).

For example, from the Off state 102, a determination may be made whether the input signal (sw) goes from a negative value to a value that is greater than or equal to 0. If it does, the model 100 transitions from the Off state 102 to the On substate 108 of the Debounce state 104. If the input signal (sw) returns to a value below 0, the model 100 transitions from the Debounce state 104, in particular, from the On substate 108, back to the Off state 102. On the other hand, if the model 100 remains in the On substate 108 of the Debounce state 104 for more than 0.1 seconds, meaning the input signal (sw) has stayed at a value that is greater than or equal to 0 for more than 0.1 seconds (sec), the model 100 transitions from the Debounce state 104 to the On state 106. In other words, if the input signal (sw) does not stay at a value greater than or equal to 0 for more than 0.1 seconds, suggesting the occurrence of transient changes in the signal, the Debouncer state 104 prevents the model 100 from transitioning from the Off state 102 to the On state 106.

Likewise, from the On state 106, a determination may be made whether the input signal (sw) is a value that is less than zero. If it does, the model 100 transitions from the On state 106 to the Off substate 110 of the Debounce state 104. If the input signal (sw) returns to a value that is equal to or greater than zero, the model 100 transitions from the Debounce state 104, in particular, the Off substate 110, back to the On state 106. On the other hand, if the model 100 remains in the Off substate 110 for more than 0.03 seconds, meaning the input signal (sw) has stayed at a value that is less than zero for more than 0.03 seconds, the model 100 transitions from the Debounce state's Off sub state 110 to the Off state 102. In other words, if the input signal (sw) does not stay at a value that is less than zero for more than 0.03 seconds, suggesting the occurrence of transient changes in the signal, the Debounce state 104 prevents the model 100 from transitioning from the On state 106 to the Off state 102.

To achieve its functionality, the model 100 utilizes temporal logic operators that control execution of a model in terms of time. For example, as indicated at first and second action statements 112 and 114, which guard first and second state transitions 116 and 118, the model 100 utilizes an 'after' temporal logic operator. The first action statement 112 indicates that the first transition 116 will be triggered after 0.1 seconds of simulation time have elapsed since activation of the Debounce state's On substate 108. The second action statement 114 indicates that the second transition 118 will be triggered after 0.03 seconds of simulation time have elapsed since activation of the Debounce state's Off sub state 110.

While temporal logic operators, such as the 'after' operator used in the model 100, are extremely useful when modeling state machines, they may result in the creation of relatively complex models. The operator of the present disclosure, which is termed a duration operator, can greatly simplify the construction and execution of models. During execution, a duration operator may track how long a condition has been true, such as a condition relating to a finite state machine.

Figure 2:
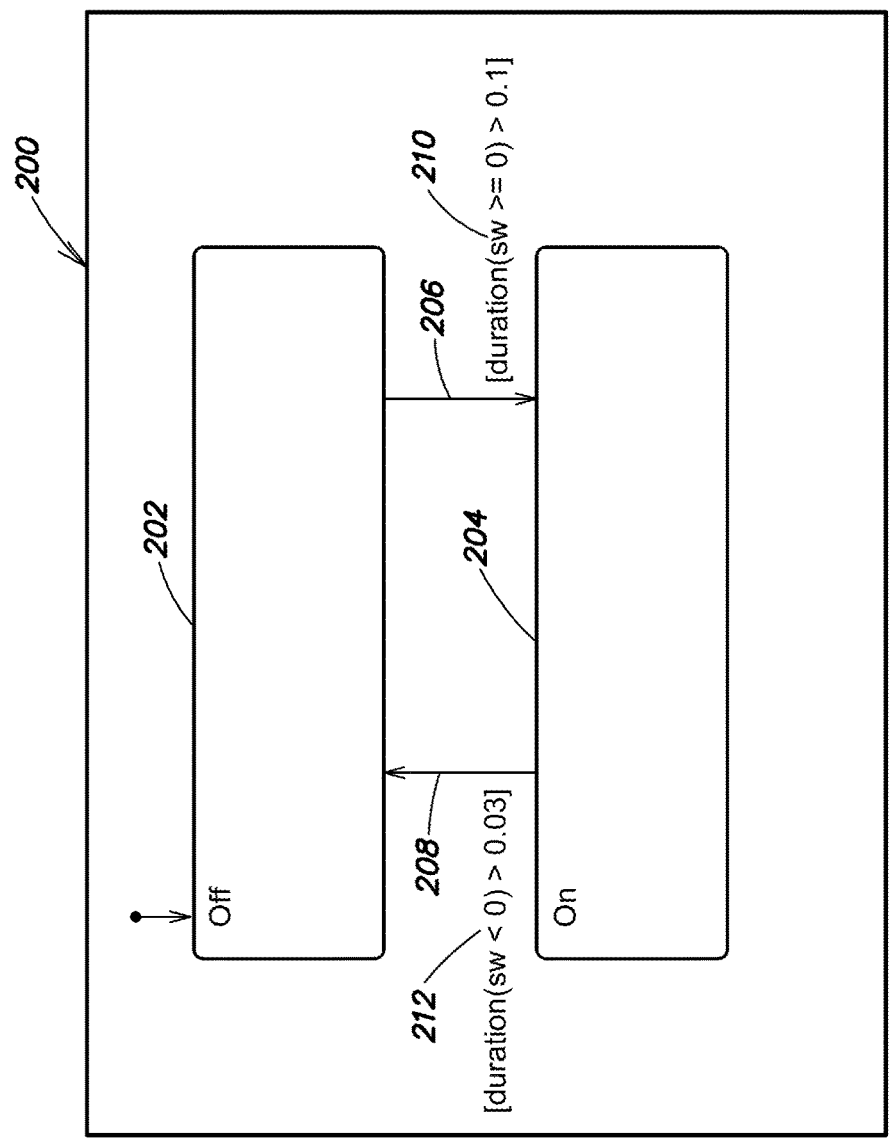
FIG. 2 is a schematic illustration of an executable model in accordance with an embodiment.

FIG. 2 is a schematic illustration of an executable graphical model 200 of debouncer logic using a duration operator in accordance with an embodiment of the present disclosure. The model 200 includes an Off state 202 and an On state 204. A first transition 206 transitions the model 200 from the Off state 202 to the On state 204, and a second transition 208 transitions the model 200 from the On state 204 to the Off state 202. Both the first and second transitions 206 and 208 are guarded by action statements 210 and 212 utilizing the duration operator. In some embodiments, a duration operator may have a syntax or form of:

y=duration (condExpr)

which assigns to the variable 'y' the value of how long, for example in terms of model simulation time, the condition 'condExpr' has been true.

The first action statement 210 permits the model 200 to transition from the Off state 202 to the On state 204 when the input signal (sw) has been greater than or equal to 0 for more than 0.1 seconds. The second action statement 212 permits the model 200 to transition from the On state 204 to the Off state 202 when the input signal (sw) has been less than zero for more than 0.03 seconds.

Figure 3:
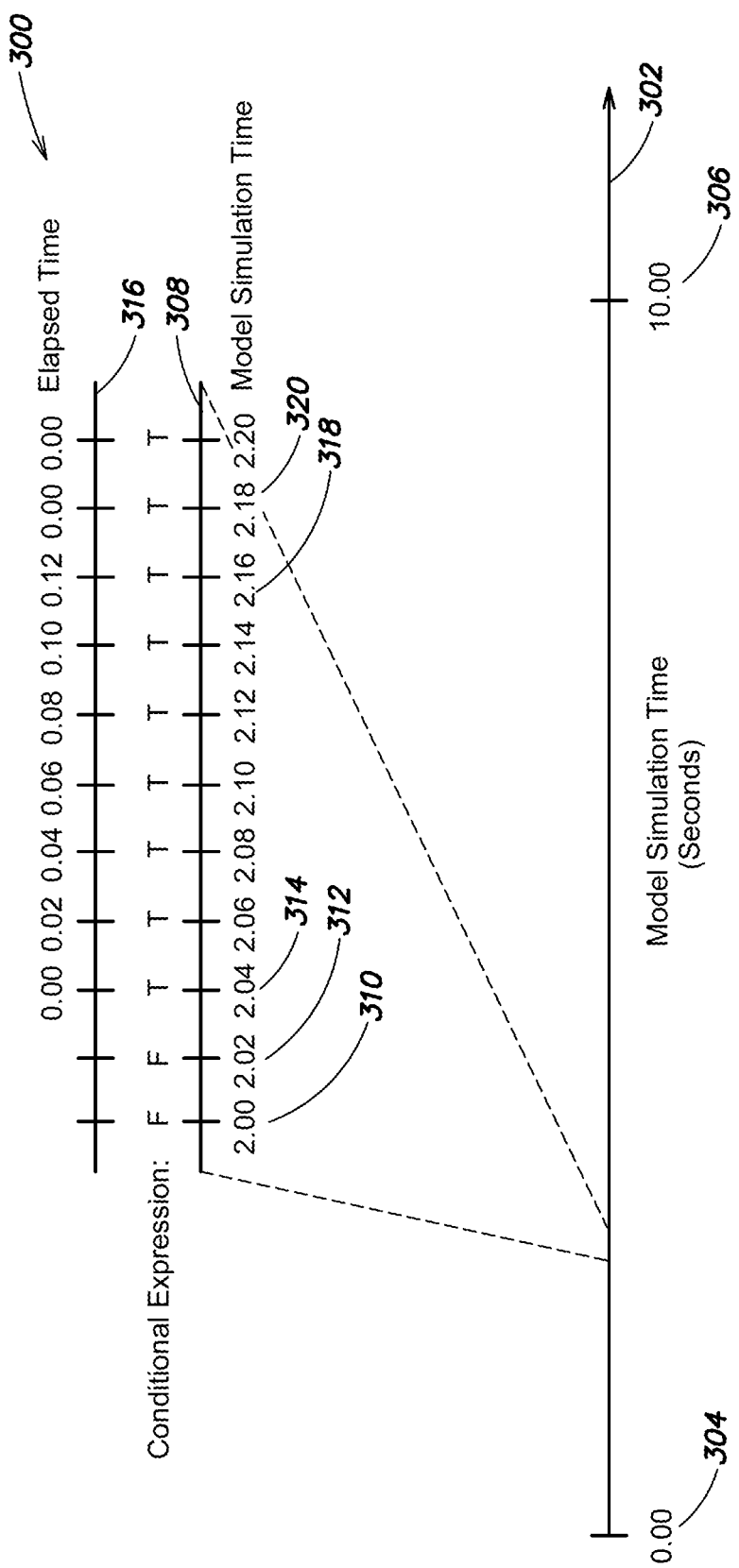
FIG. 3 is a schematic illustration of a simulation time for the model of FIG. 2

FIG. 3 is a schematic illustration of a timing diagram 300 illustrating the evaluation of the action statement 210 (FIG. 2) over the model's simulation time. Suppose the model 200 executes over a simulation time as indicated by simulation time line 302 beginning at a simulation start time of 0.00 seconds indicated at 304, and ending at a simulation end time of 10.00 seconds indicated at 306. Suppose also that the model 200 is in the Off state 202, and that the conditional expression of the first action statement 210 is evaluated every 0.02 seconds, starting at least from simulation time 2.00 seconds and continuing to simulation time 2.20 seconds, as indicated by a second simulation time line 308 having greater granularity than line 302. At simulation times 2.00 seconds indicated at 310 and 2.02 seconds indicated at 312 the conditional expression is False (F). The conditional expression becomes True (T) starting at simulation time 2.04 seconds indicated at 314, and the model begins tracking the elapsed time, as indicated by elapsed time line 316. At simulation time 2.16 seconds indicated at 318, the conditional expression has been True for 0.12 seconds of model simulation time, which is more than 0.1 seconds. Accordingly, as a result of the model's design, the model 200 transitions from the Off state 202 to the On state 204. In an embodiment, because the Off state 202 becomes inactive (in response to the transition to the On state 204), the elapsed time for the conditional expression of the first action statement 210 is reset, e.g., to zero, at simulation time 2.18 seconds indicated at 320 on the elapsed time line 316.

As illustrated by comparing FIGS. 1 and 2, the duration operator allows a user to construct a much simpler model to implement dynamic and other systems, such as debouncer logic. The model may also execute more efficiently, e.g., faster. For example, the Debounce state 104 of the first model 100 which includes two substates 108 and 110 is eliminated from the second model 200, which only requires the Off and On states 202 and 204. Furthermore, the 'L_on' variable included in the first model 100 is eliminated from the second model 200. Instead, the second model 200 includes a signal that represents the currently active state, i.e., Off or On. For example, a state variable, such as an active state variable of the Stateflow language, whose value is either 0 or 1, e.g., off or on, may be utilized. This is possible because the second model 200 has only two states.

In addition, code generated for the second model 200 may be smaller for example have fewer lines of code, fewer variables, and/or fewer files than code generated for the first model 100, thereby requiring fewer memory resources and executing more efficiently. Regarding HDL code, HDL code generated for the second model 200 may require fewer hardware resources, for example fewer registers, Adders, Multipliers, Lookup Tables, etc., than HDL code generated for the first model 100.

Modeling Environment

Figure 4:
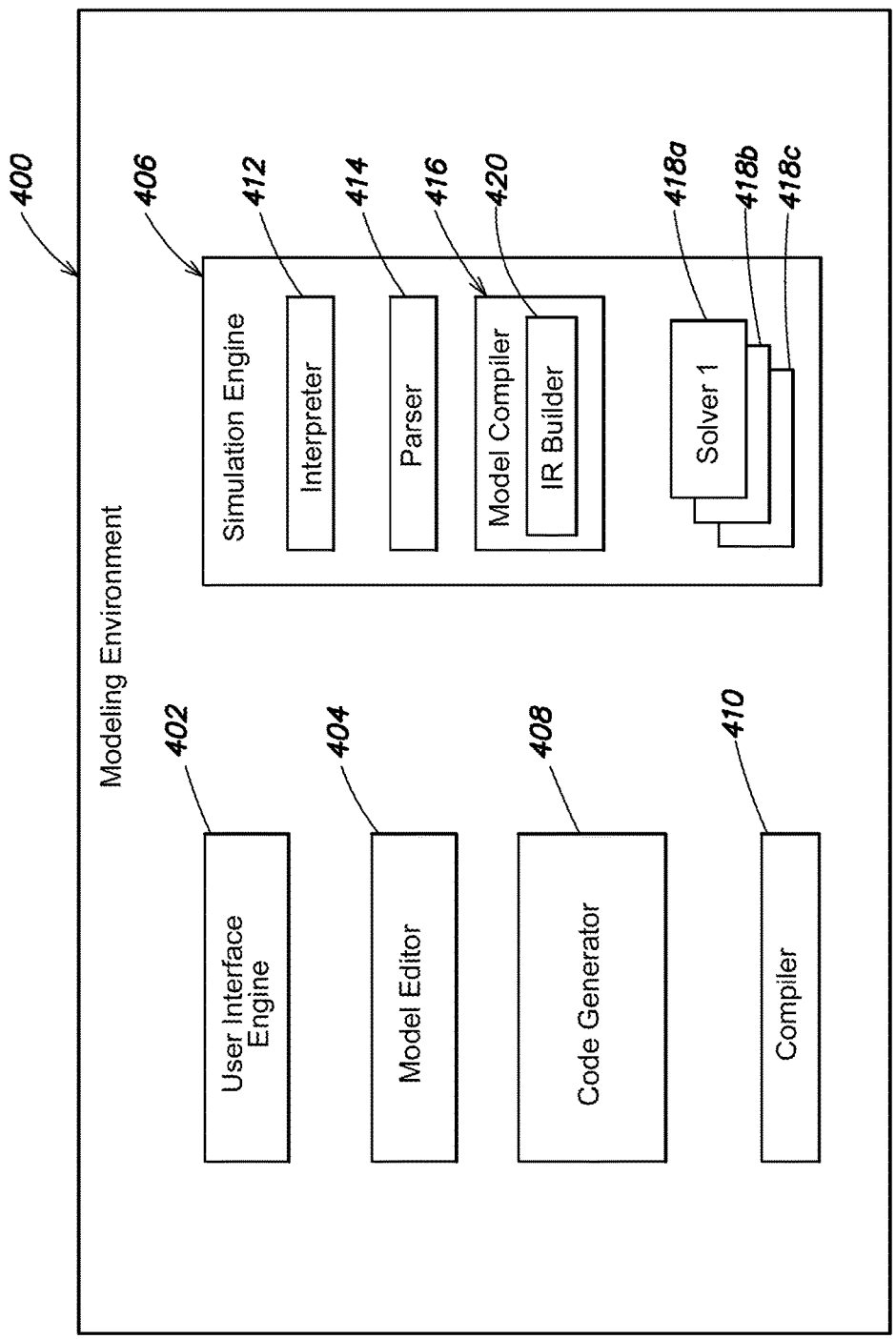
FIG. 4 is a schematic illustration of a modeling environment in accordance with an embodiment.

FIG. 4 is a partial, schematic diagram of a modeling environment 400 in accordance with an embodiment. The modeling environment 400 may include a User Interface (UI) engine 402, a model editor 404, a simulation engine 406, a code generator 408, and a compiler 410. The UI engine 402 may create and present one or more User Interfaces (UIs), such as Graphical User Interfaces (GUIs) and/or Command Line Interfaces (CLIs), on the display of a workstation, laptop, tablet, or other data processing device. The GUIs and CLIs may provide a user interface to the modeling environment 400, and may be operated by users to initiate various model-related tasks, such as opening, creating, and saving models. The model editor 404 may perform selected operations on a model, such as open, create, edit, and save, in response to the user inputs or programmatically. In particular, the UI engine 402 and model editor 404 may provide or support a GUI having a model canvas for displaying a graphical model and/or a code editor for presenting a textually defined model.

The simulation engine 406 may include an interpreter 412, a parser 414, a model compiler 416, and one or more solvers, such as solvers 418a-c. The model compiler 416 may include one or more Intermediate Representation (IR) builders, such as IR builder 420. In some implementations, one or more IR builders may be included or associated with the solvers 418. The simulation engine 406 may execute, e.g., compile and run or interpret, computer-generated models using one or more of the solvers 420a-c. Exemplary solvers include one or more fixed-step continuous time solvers, which may utilize numerical integration techniques for example based on Euler's Method or Heun's Method, and one or more variable-step solvers, which may be based on the Runge-Kutta and Dormand-Prince pair. With a fixed-step solver, the step size remains constant throughout simulation of the model. With a variable-step solver, the step size can vary from step to step, for example to meet error tolerances. For a model that does not have continuous states, a fixed-step discrete solver or a variable-step discrete solver may be used. A non-exhaustive description of suitable solvers may be found in the *Simulink User's Guide* from The MathWorks, Inc. (Oct. 2014 ed.), In some implementations, the code generator 408 may be separate from the modeling environment 400. The code generator 408 may access a model, such as a model constructed in the modeling environment 400, and generate code for the model. The generated code may be source code and may be compiled and executed by a data processing device.

In some embodiments, the user interface engine 402, the model editor 404, the simulation engine 406, the code generator 408, and/or the compiler 410 may be implemented through one or more software modules or libraries containing program instructions pertaining to the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In some embodiments, the user interface engine 402, the model editor 404, the simulation engine 406, the code generator 408, and/or the compiler 410 may comprise hardware registers and combinational logic configured and arranged to produce sequential logic circuits. In some embodiments, various combinations of software and hardware, including firmware, may be utilized to implement the described methods.

A model, such as a graphical model, may be executed by the simulation engine 406. For example, a user may select the Run button presented by the UI engine 402, or enter a text-based command. A model may also be executed programmatically. Model execution may include a compile stage, a link stage, and a simulation loop stage. The compile and link stages may be performed by the model compiler 416 of the simulation engine 406. The compile stage may mark the start of execution of the model, and may involve preparing data structures and evaluating parameters, configuring and propagating model element characteristics (e.g., sample times, data types, etc.), determining block connectivity, performing block reduction and block insertion, and generating a sorted order of the equations corresponding to the individual blocks of the model.

The preparation of data structures and the evaluation of parameters may create and initialize one or more data structures used in the compile stage. For each of the blocks, a method may force the block to evaluate all of its parameters. This method may be called for all blocks in the design model. If there are any unresolved parameters, execution errors may be thrown. During the configuration and propagation of block and port/signal characteristics, the compiled attributes (such as data dimensions, data types, complexity, sample modes, and sample time) of each model element (and/or ports) may be setup on the basis of the corresponding behaviors and the attributes of model elements (and/or ports) that are connected to the given model element through lines, e.g., arrows.

The attribute setup may be performed through a process during which block behaviors "ripple through" the design model from one block to the next following signal or other connectivity, and may for example follow connectivity in a forward or backward manner. This process is referred to as "propagation." In the case of a model element that has explicitly specified its model element (or its ports') behaviors, propagation helps ensure that the attributes of the model element are compatible with the attributes of the model elements connected to it. If not, an error may be issued. At least some model elements may be implemented to be compatible with a wide range of attributes. Such model elements may adapt their behavior in accordance with the attributes of the model elements connected to them. The exact implementation of the model element may be chosen on the basis of the model in which the model element is located. Included within this step are other aspects such as validating that all rate-transitions yield deterministic results, and that the appropriate rate transition blocks are being used.

The compilation step also may determine model element connectivity. For example, a model may include one or more virtual blocks, which may play no semantic role in the execution of the model. In this step, the virtual blocks may be optimized away, e.g., removed, and the remaining non-virtual model elements may be reconnected to each other appropriately. This compiled version of the model with actual model element connections may be used from this point forward in the execution process.

One or more in memory representations, such as intermediate representations (IRs), may be generated for the model by the IR builder 420. At least one of the IRs may be in the form of a directed graph, such as a hierarchical, Data Flow Graph (DFG) having a plurality of nodes interconnected by edges. The nodes of the IR may represent model elements from the executable graphical model, the edges of the IR may represent connections among the model's model elements. Special nodes, called network instance components (NICs), may be used to provide hierarchy in the IR, for example, by abstractly representing subsystems or other components of the model. In some implementations, model elements of the model may map to one or more nodes of the IR, and lines or arrows of the model may map to one or more edges of the IR.

It should be understood that an IR may take other forms, such as a Control Flow Graph (CFG), Control Data Flow Graph (CDFG), program structure tree (PST), abstract syntax tree (AST), a netlist, etc. A CDFG may capture the control flow as well as the data flow of a graphical model through data dependency and control dependency edges.

The in-memory representation or IR may be stored in memory, such as the main memory or a persistent memory of a data processing device.

Following the compilation stage, code may or may not be generated for the model. If code is generated, the model may be executed through an accelerated execution mode in which the model, or portions of it, is translated into either software modules or hardware descriptions, which is broadly referred to herein as code. If this stage is performed, then the stages that follow may use the generated code during the execution of the model. If code is not generated, the model may execute in an interpretive mode in which the compiled and linked version of the model may be directly utilized to execute the model over the desired time-span. When users generate code for a model, they may choose to not proceed further with the model's execution. Instead, they may choose to take the generated code and deploy it outside of the confines of the modeling environment 400.

Code may be generated in response to user input or programmatically. For example, a user may select a code generation command button presented by the UI engine 402. Alternatively, the user may enter a text command to generate code for the model. In an embodiment, before launching the code generation process for the model, one or more code generation parameters or options may be selected for the model. Exemplary code that may be generated include textual source code compatible with a programming language, such as C, C++, C#, Ada, Structured Text, Fortran, and MATLAB, among others. Alternatively or additionally, the generated code may be in the form of object code or machine instructions, such as an executable, suitable for execution by a target device, such as a central processing unit, a microprocessor, a digital signal processor, etc. The generated code may be in the form of a hardware description, for example, a Hardware Description Language (HDL), such as VHDL, Verilog, a netlist, or a Register Transfer Level (RTL) description. The hardware description may be utilized by one or more synthesis tools to configure a programmable hardware device, such as Programmable Logic Devices (PLDs), Field Programmable Gate Arrays (FPGAs), and Application Specific Integrated Circuits (ASICs), among others. The generated code may be stored in memory, such as a main memory or persistent memory or storage.

The link stage may involve memory allocation, and generation of a block method execution list from the sorted order. In an embodiment, once the compilation and link stages are completed, the sorted order may not be changed for the entire duration of the model's execution. During the simulation loop stage, the compiled and linked version of the model may be directly utilized by the simulation engine 406 to execute the model in an interpreted mode. The way in which model elements are interconnected in the model does not necessarily define the order in which the equations (methods) corresponding to the individual model elements will be solved (executed). The actual order may be determined during the sorting step in compilation.

Model execution may be carried out for one or more top-level inputs, and may produce one or more results, which may be referred to as top-level outputs. As noted, model execution may take place over a time-span, e.g., a simulation time, which may be user specified or machine specified. For example, execution may begin at a simulation start time, include one or more time steps, and end at a simulation stop time. The start time, time steps, and end time may be logical and have no correspondence with the physical passage of time. Nonetheless, in some implementations, such as models designed for real-time execution, the start time, time steps, and end time may have a correspondence with the physical passage of time.

Flow Diagrams

Figure 5:
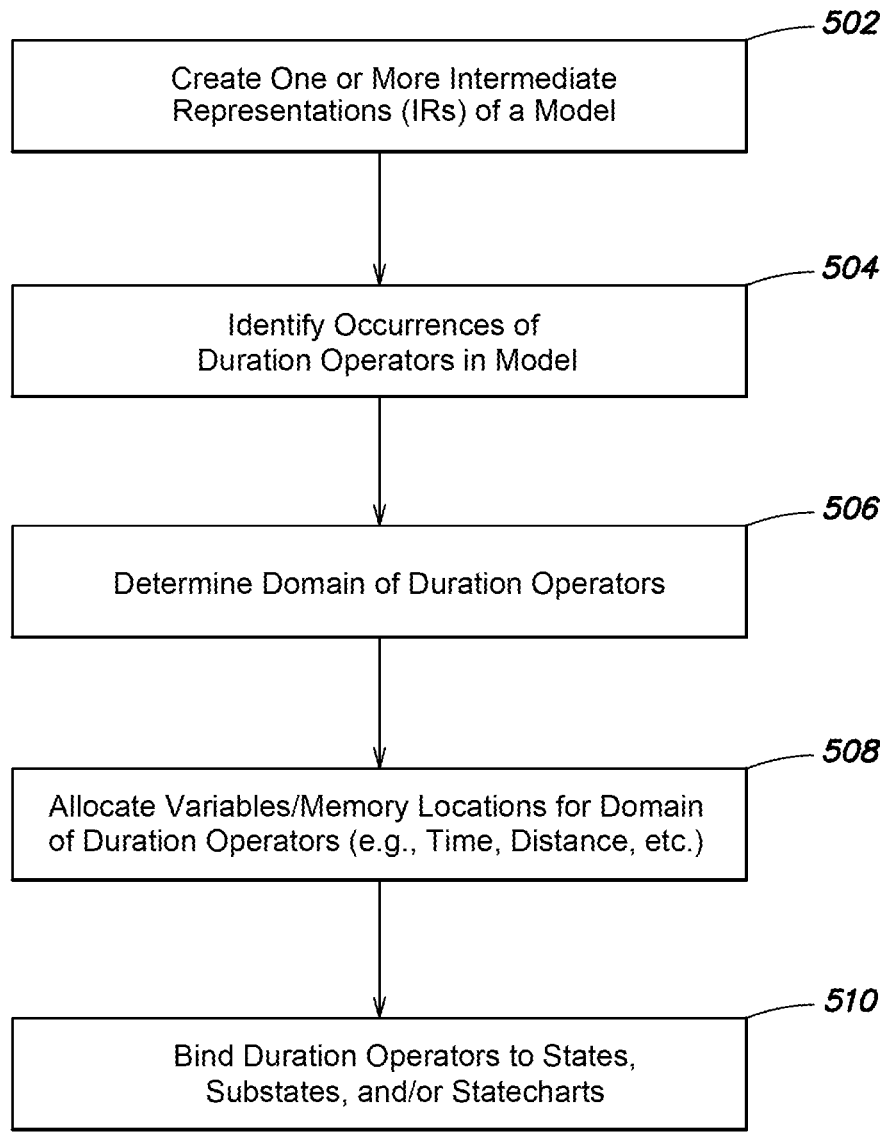
FIG. 5 is a schematic illustration of a flow diagram of a method in accordance with an embodiment.

FIG. 5 is a flow diagram of a method in accordance with an embodiment. The simulation engine 406 may execute a model in stages, such as an initialization stage and an execution stage. During the initialization stage, the IR builder 420 may create one or more in-memory representations, such as one or more intermediate representations (IRs), of the model, as indicated at step 502, and may store the IRs in a memory, such as the main memory of a workstation. The parser 414 may analyze an IR of the model and identify, among other things, occurrences of duration operators, as indicated at step 504 in the model and represented in the IR. The parser 414 may determine the domain of the identified duration operators, as indicated at step 506. In some embodiments, duration operators may operate in a time domain associated with a model, for example, the simulation time of a model.

In some embodiments, a duration operator may be utilized within a domain for which a valid metric is defined. Such a metric may have the following properties:

$d(x, y) \geq 0$ (non-negativity, or separation axiom);

$d(x, y)=0$ if and only if $x=y$ (identity of indiscernibles, or coincidence axiom);

$d(x, y)=d(y, x)$ (symmetry); and $d(x, z) \leq d(x, y)+d(y, z)$ (subadditivity/triangle inequality).

In some embodiments, a duration operator may be utilized even though one or more of the above-identified properties is not adhered to, such as the non-negativity property.

In other embodiments, duration operators may operate in domains from which a measurement can be taken between two points, e.g., an initial reference point from which tracking begins and a current point. Examples include time, distance traveled, angular rotation, etc. In some embodiments, the domain may be monotonically increasing. Other examples include a discrete event domain in which the domain is unevenly spaced but consists of the number of times an event has fired, the volume of a fluid flowing through a pipe or being added to a container, the angular rotation of an object, the displacement of a ship being loaded with cargo, etc.

The model compiler 416 may allocate state or other variables and or memory locations for one or more of the duration operators identified in the model, as indicated at step 508. The value of a particular state variable may represent the absolute model time whose units may be user-specified or set by default. For accumulated time, a counter, such as a non-dimensionalized discrete time counter, or a state variable that stores accumulated time may be used. In some embodiments, the model compiler 416 may utilize a symbol table containing information, such as memory address, data type, data dimension, complexity, value, etc., of state variables. The symbol table may be implemented as a hash table or other data structure in memory. The model compiler 416 also may bind the duration operators identified in the model to one or more states or substates of the model, as indicated at step 510. For example, duration operators may be included within action statements specified for a state or a substate of the model. Duration operators also may be included in the transitions between states and/or substates, and in the entry points to a statechart. If a duration operator is included in an action statement specified for a state or substate, the model compiler 416 may bind the duration operator to that state or substate. If a duration operator is included in a transition from a first state to a second state, the model compiler 416 may bind the duration operator to the first state. If a duration operator is included in an entry point to a statechart, the model compiler 416 may bind the duration operator to that statechart. In some embodiments, a duration operator may be bound to a single state, substate, or statechart.

It should be understood that, in other embodiments, different bindings may be utilized, thereby supporting other semantics of a duration operator. For example, a duration operator included in a transition from a first state to a second state may be bound to the second state.

Figure 6A:
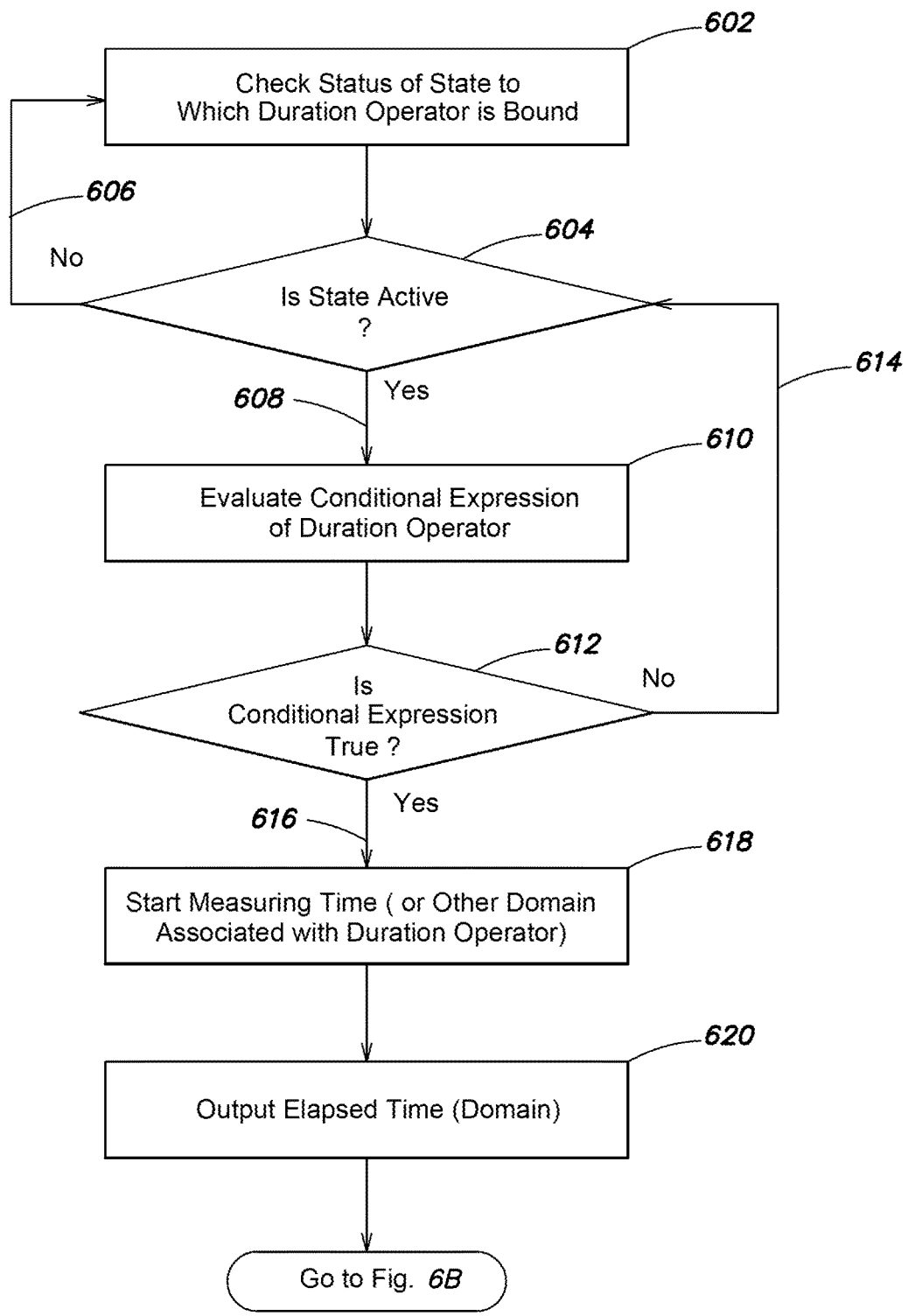
FIGS. 6A and 6B are partial views of a flow diagram of a method in accordance with an embodiment.
Figure 6B:
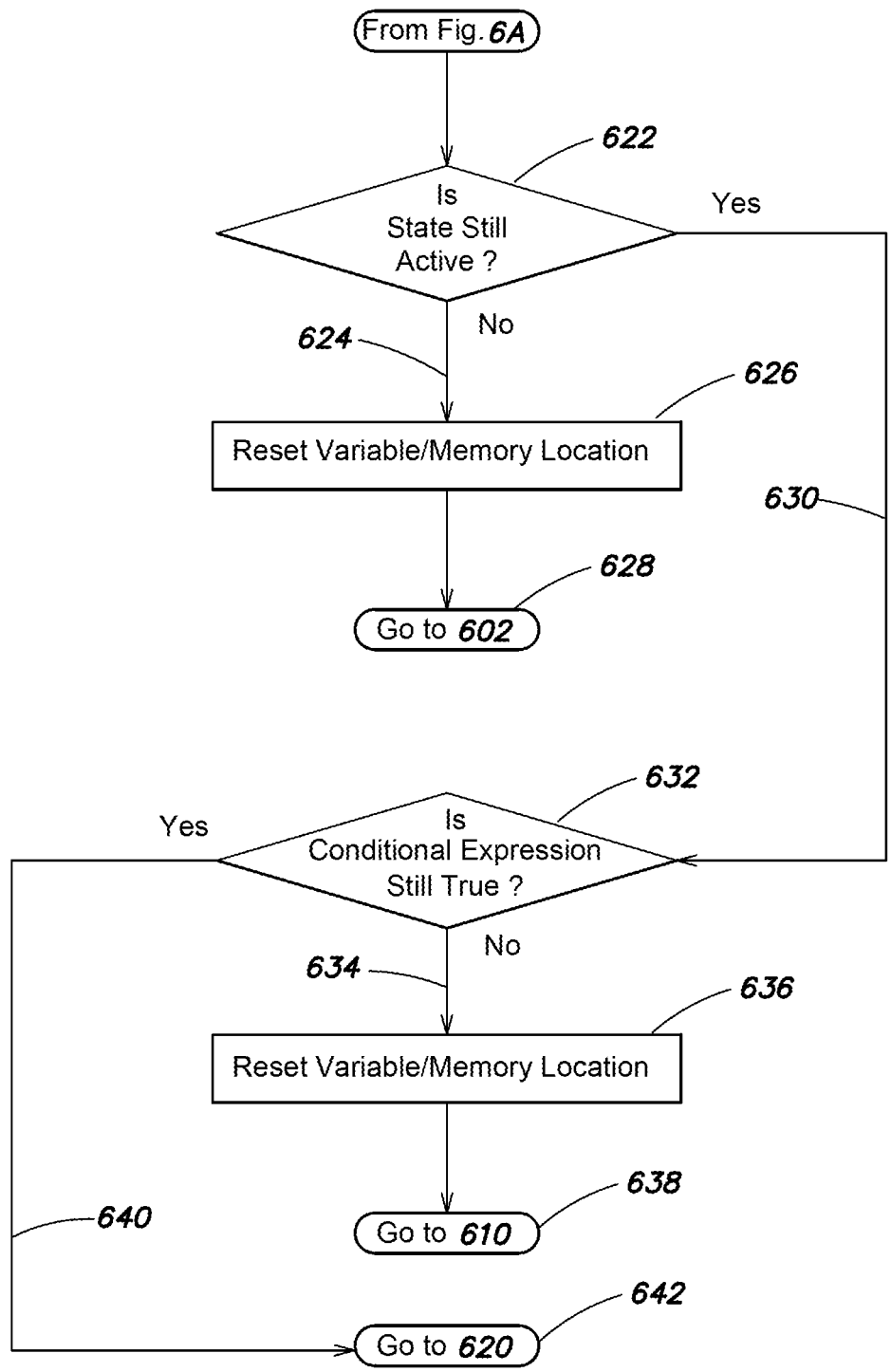

FIGS. 6A-B are partial views of a flow diagram of a method in accordance with an embodiment. During the execution stage of a model, the simulation engine 406 may check the status of a state to which a given duration operator is bound, as indicated at step 602. The simulation engine 406 may determine whether the state is active or inactive, as indicated at decision step 604. If the state is inactive, processing may return to step 602, as indicated by No arrow 606. If the state is active, the simulation engine 406 may evaluate the conditional expression of the given duration operator, as indicated by Yes arrow 608 leading to step 610. In some embodiments, the conditional expression defined for a duration operator may evaluate to either True or False, and the simulation engine 406 may determine whether the duration operator evaluates to True or False, as indicated at decision step 612. If the simulation engine 406 determines that the conditional expression evaluates to False, processing may return to step 604, as indicated by No arrow 614. If the simulation engine 406 determines that the conditional expression evaluates to True, the simulation engine 406 may begin measuring the domain associated with the given duration operator, as indicated by Yes arrow 616 leading to step 618. For example, if the domain is time, the simulation engine 406 may begin tracking the elapsed simulation time starting from zero or some other starting value. The simulation engine 406 may output the elapsed simulation time, as indicated at step 620. For example, the elapsed simulation time may be available, e.g., through a state variable, to other portions of the model. In some implementations, the elapsed time may be displayed to the user, for example through one or more graphical affordances presented on a display screen of a data processing device, such as a computer. Additionally or alternatively, the elapsed time may be logged, etc.

The simulation engine 406 may include functionality for tracking simulation time during execution of a model. For example, the Simulink model-based design environment includes a Clock block. At each simulation time step of a model, the Clock block may output the simulation time. The functionality of the Clock block may be implemented through a state machine containing a state variable that keeps track of a current time. The Clock block may include an update method that is called each time the Clock block executes, and the update method may increment the time by a fixed amount per cycle. The Clock block may provide a minimum granularity, such as milliseconds. To start measuring elapsed time, the Clock block may be reset to zero. To measure absolute time, a reference time may be stored, for example in a state variable, and the output of a Clock block may be used in combination with the reference time to arrive at an elapsed time.

The simulation engine 406 may continue to determine whether the state to which the given duration operator is bound remains active, as indicated at decision step 622 (FIG. 6B). If the state is no longer active, for example the state becomes inactive following a transition to another state of the model, the simulation engine 406 may reset the state variable for the given duration operator to a starting value, e.g., to zero, as indicated by No arrow 624 leading to step 626. Processing may then return to step 602 (FIG. 6A), as indicated by Go To step 628. Returning to decision step 622, assuming the state to which the given duration operator is bound remains active, the simulation engine 406 may determine whether the conditional expression of the given duration operator remains True, as indicated by Yes arrow 630 leading to decision step 632. If the conditional expression is now determined to be False, the simulation engine 406 may reset the state variable for the given duration operator to a starting value, e.g., to zero, as indicated by No arrow 634 leading to step 636, and processing may return to step 610 (FIG. 6A), as indicated by Go To step 638. Alternatively, the tracking may pause and the value of the state may be retained, and tracking may start from the retained value when the condition is True again (and the bounded state is still active). Which one of the embodiments is to be used may be indicated by the user, for example by a parameter for the duration operator or a differently named operator. Returning to decision step 632, if the state is still active and the conditional expression is still True, the simulation engine 416 may continue to track the elapsed time (or other domain), and may make the elapsed time available to the model, as indicated by Yes arrow 640 leading to Go To step 642.

Code Generation

The code generator 408 may automatically generate code for a model that includes one or more duration operators. The generated code may be source code conforming to a programming language, such as the C programming or the C++ programming languages, among others. Alternatively, the code generator 408 may automatically generate a hardware description for a model, such as a VHDL description.

Suppose, for example, that a model includes the following statement:

$$y=\text{duration}(in1+in2>0) \tag{1}$$

FIG. 7 is a schematic illustration of code 700 automatically generated by the code generator 408 for the above statement.

The generated code 700 includes a plurality of lines, e.g., lines 1-6. Lines 1-5 of the generated code 700 may be executed each time the state machine to which the duration operator is bound is executed. Lines 1-5 determine whether the condition of the duration operator, namely in1+in2 is greater than zero, has not been True for two consecutive executions or evaluations. If the condition has not been True for two consecutive executions, i.e., if the condition was False in either the immediately preceding execution or the current execution, then, on line 3, the 'durationRefTime' variable is set to the value of the then current simulation time. However, if the condition becomes True for two consecutive executions, then line 3 is not executed, i.e., 'durationRefTime' is held, e.g., kept, at the value assigned immediately before the condition became True for two consecutive executions, and is held until the condition is no longer True.

Line 6 of the generated code 700 may be evaluated at the evaluation site of the statement containing the duration operator.

When the condition of the duration operator is False either in the current execution or in the immediately preceding execution, then 'durationRefTime' follows, e.g., tracks, the current simulation time. For example, 'durationRefTime' may be synced (or move in lock step) with the current simulation time. Accordingly, at the evaluation site, y evaluates to zero, since 'durationRefTime' and the current time are the same values.

Once the condition has been True for two consecutive executions, 'durationRefTime' is no longer updated, i.e., the value of the 'durationRefTime' variable is held at, e.g., latched to, the time of the immediately preceding execution. Accordingly, at the evaluation site, y evaluates to the elapsed time, e.g., the difference between the current simulation time and the simulation time immediately preceding when the condition first became True for two consecutive executions.

In some embodiments, the 'condWasTrueLastTime' and 'durationRefTime' variables of the generated code 700 may be implemented through state variables. The 'durationRefTime' variable may encode the start of a waiting state. The waiting state may begin when the condition first becomes True and may end when the condition has been True for two consecutive executions, when the On state is entered. That is, the Waiting state reflects the first time, e.g., execution, when the condition changed to True where it was previously False. In some implementations, the Off and Waiting states may be collapsed into a single conditional branch of the generated code.

Figure 8:
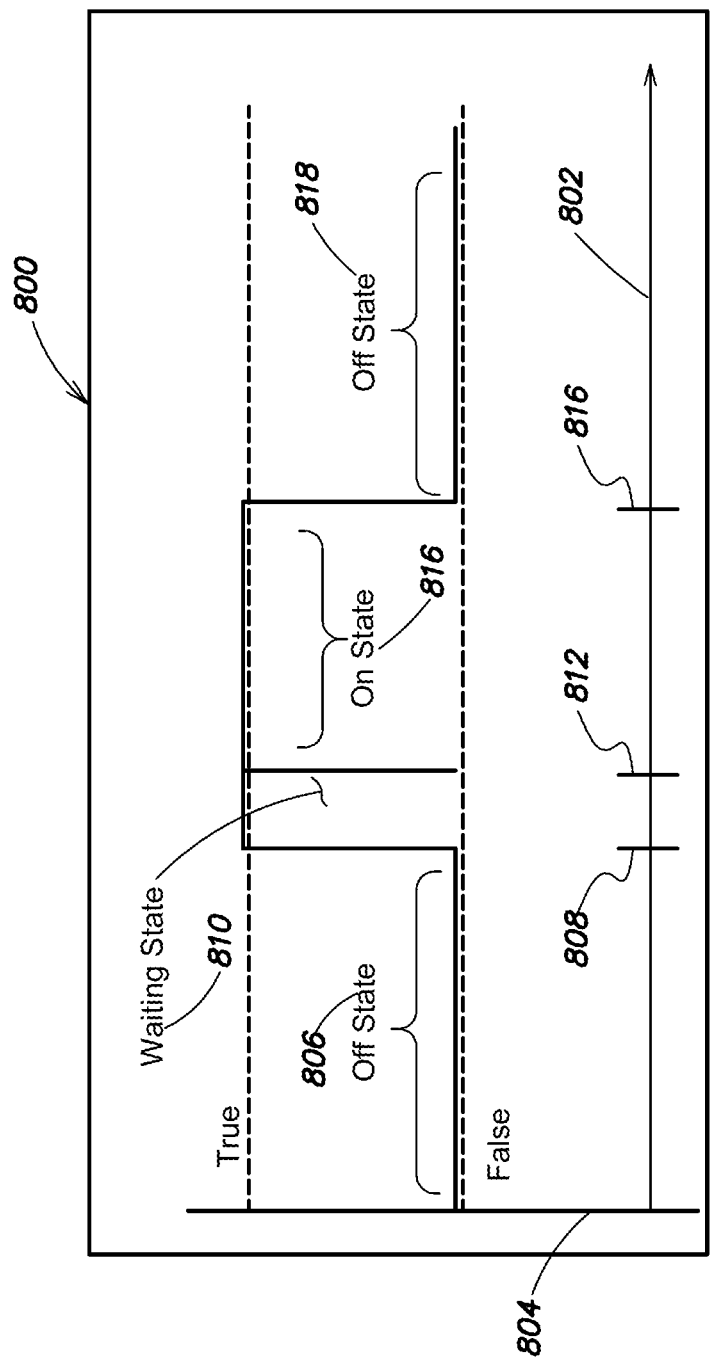
FIG. 8 is a schematic illustration of a timing diagram.

FIG. 8 is a schematic illustration of a timing diagram 800 of the conditional expression of a duration operator. A horizontal axis 802 of the timing diagram 800 may represent time, and a vertical axis 804 indicates whether the condition of the duration operator evaluates to True or False. Initially, the condition evaluates to False, and the state variables may be in an Off state, as indicated at 806. When the condition first evaluates to True, as indicated by a first mark 808 on the time axis 802, the state variables may be in a Waiting state, as indicated at 810. If the condition evaluates to True at the next execution, as indicated by a second mark 812 on the time axis 802, the state variables may be in an On state, as indicated at 814. At the execution at which the condition evaluates to False, as indicated by a third mark 816 on the time axis 802, the state variables may return to an Off state, as indicated at 818.

A continuous time solver may need to determine the occurrence of 'zero crossings' during execution of a model. The code generator 408 may generate additional code for detecting zero crossings.

FIG. 9 is a schematic illustration of generated code 900 continuing with statement (1) and generated code 700 (FIG. 7). The generated code 900 may include a plurality of lines, such as lines 1-5.

The generated code 900 determines whether, over two consecutive executions, the 'condIsTrue' variable went from True to False or False to True.

It should be understood that the code generator 408 may generate code for a duration operator in other ways. FIG. 10 is a schematic illustration of alternative code 1000 that may be generated by the code generator 408 for statement (1). The generated code 1000 may include a plurality of lines, such as lines 1-8.

At line 2 of the code 1000, the first branch (if) may correspond to the Off state, while at line 4 the second branch (elseif) may correspond to the Waiting state. Lines 1-6 of the code 1000 may be executed with each execution of the state to which the duration operator is bound. The term 'NaN' stands for not a number, and may be the value assigned to a variable having a numeric datatype when an operation returns an undefined numeric result for the variable. For example, the variable 'x' may be assigned a NaN value as a result of an invalid operation on 'x', such as divide by zero. A system may provide multiple NaN values that may be assigned to variables. The function 'isNaN' may return True if the value of its input argument is a NaN value; otherwise, the function may return False, if the value of the input argument is a numeric value, such as '11'. Lines 7-8 of the code 1000 may represent the code at the evaluation site of the duration operator.

In some embodiments, the generated code 1000 may take advantage of the fact that the state variables for the duration operator can only be in one of the Off state, the Waiting state, or the On state at any time, and that the states can only transition in a particular order, e.g., from the Off state to the Waiting state, from the Waiting state to either the On state or the Off state, and from the On state to the Off state. For example, a single variable, which may be named 'durationRefTime', having a large range of numeric values may be used to encode all three states, reserving one possible value, e.g., NaN, to the Off state, and assigning the remaining possible values, e.g., non-NaN, to the Waiting and On states. At line 3 of the code 1000, the 'durationRefTime' variable is assigned a NaN value. The Waiting state may be defined as the first execution following the Off state where the condition is True, and the 'durationRefTime' variable is a non-NaN value, i.e., lines 4-5. The On state may be defined as subsequent executions following the Waiting state where the condition remains True, and the 'durationRefTime' variable may be held at the value determined in the Waiting state, i.e., lines 7 and 8 of the code 1000. Lines 7 and 8 form a statement for setting the value of the variable 'y'. If the durationRefTime state variable has a NaN value, then the variable 'y' is assigned the value of 0, implying that the condition has been True for 0 amount of time. Otherwise, the variable 'y' is assigned the difference between the current time, which may be obtained from a Clock block, and the original reference time as encoded in the durationRefTime state variable.

In other words, a NaN value and the isNaN function may be utilized such that the 'durationRefTime' variable indicates both the state, i.e., Off, Waiting, or On, and the elapsed time, when in the On state. In another embodiment, the 'durationRefTime' variable may be set to a NaN value if the condition in the current execution just became True, is not True, or just became False (e.g., the Off and Waiting states), and may be set to how long the condition has been True if the condition has been True for a nonzero amount of time (e.g., the On state). Determining the current state then becomes a matter of checking whether the 'durationRefTime' variable contains a valid number.

FIG. 11 is a schematic illustration of generated code 1100 for determining the current state and calculating the duration when the 'durationRefTime' variable is a valid number. The code 1100 may include a plurality of lines, such as lines 1-5, and may be structured in the form of If-Then-Else. As indicated at line 1, a determination may be made whether the 'durationRefTime' variable is a valid number, e.g., is not a NaN value. If so, the duration is computed at line 2 by obtaining the current time and subtracting the value of the 'durationRefTime' variable. If the 'durationRefTime' is a NaN value, then lines 3 and 4 are executed, and the duration is set to zero.

It should be understood that other functions besides isNaN may be utilized to encode the Off state. For example, with reference to the MATLAB programming language, other functions include isInf, isMax, isNegative, and isMin. The isInf function may return True if the value of its input argument is assigned to infinity. Otherwise, the isInf function may return False. The isMax function may return True if the value of its input argument is the maximum number that is representable by the datatype of the input argument. Otherwise, the isMax function may return False. The isNegative function may return True if the value of its input argument is a negative number. Otherwise, the isNegative function may return False. The isMin function may return True if the value of its input argument is the minimum number that is representable by the datatype of the input argument. Otherwise the isMin function may return False. It should be understood that other functions for querying the a reference state variable to determine whether or not a reference time has been anchored to a previous time, e.g., whether the condition has become True at a previous time and remained True until the time of evaluation, may be used.

The Off state can also be encoded as an arbitrary value, e.g., −1, as long as that value is distinguishable from other values returned by the getCurrentTime( ) function in line 5 of the code 1000. If necessary, an appropriate transform may be applied to getCurrentTime( ) function on line 5, and the reverse transform may be applied to the 'durationRefTime' variable on line 8, to allow the Waiting state to be encoded unambiguously. For example, assuming the getCurrentTime( ) function returns an integer value, an arithmetic transform can be applied to the getCurrentTime( ) function, e.g., multiplying by 2 to ensure that an even value is always returned, and the reverse transform function can be applied to the 'durationRefTime' variable on lines 7-8, e.g., dividing by 2, then, the Waiting state may be encoded as any odd value, e.g., 1.

FIG. 12 is a schematic illustration of alternative code 1200 that may be generated for statement (1). The code 1200 may include a plurality of lines, such as lines 1-8. Line 1 evaluates the Boolean condition 'condIsTrue=in1+in2>0'. The output may be True, False, or Unknown. Lines 2 and 3 set the variable 'durationRefTime to 1, if the variable 'condIsTrue' is False. Otherwise, if the variable 'condIsTrue' is True and the value of 'durationRefTime' is a NaN value, then the 'durationRefTime' variable is set to the current time multiplied by two, as indicated at lines 4 and 5. Otherwise, the variable 'y' is set to the value of the variable 'durationRefTime' and a determination is made whether the value of 'durationRefTime' is 1, as indicated at line 7. By setting 'durationRefTime' to the current time multiplied by two, the value of 'durationRefTime' is set to an even number. As with the code 1000 of FIG. 10, lines 7 and 8 of code 1200 form a statement for setting the value of the variable 'y'. If the durationRefTime state variable has a value of '1', then the variable 'y' is also assigned the value of '1'. Otherwise, the variable 'y' is assigned the difference between the current time and the original reference time divided by two.

In an embodiment, a duration operator may return elapsed time in a default unit of time, e.g., seconds. Nonetheless, a duration operator may support options for returning elapsed time in other units. For example, the duration operator may be modified by including a function, such as 'msec', to return elapsed time in milliseconds. Suppose an executable model includes the following statement:

$$y=m\sec(\text{duration}(in1+in2>0)) \quad (2)$$

Figure 13:
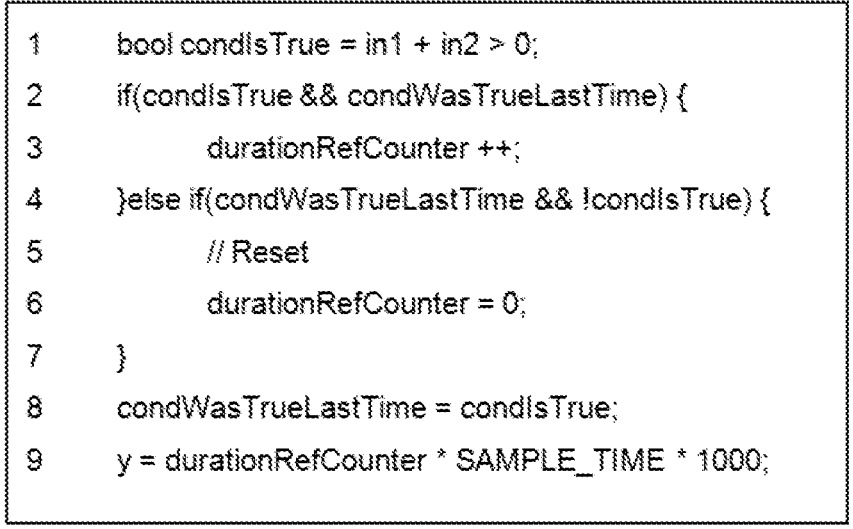
FIG. 13 is a schematic illustration of code.

FIG. 13 is a schematic illustration of code 1300 that may be generated for statement (2) above. The generated code 1300 may include a plurality of lines, such as lines 1-9.

In the code 1300, the duration operator is implemented using a counter-based approach, instead of, for example, measuring elapsed time. The counter may be implemented through the variable 'durationRefCounter' of the code 1300, which may be a state variable that implements an integer counter. For example, the 'durationRefCounter' variable may remain set to zero until the conditional expression, e.g., u being greater than zero, is True for two consecutive executions of the state to which the duration operator is bound. Starting when the conditional expression is evaluated to True for two consecutive executions, as indicated at line 2, and continuing for each execution in which the conditional expression continues to evaluate to True, the 'durationRefCounter' is incremented, as indicated at line 3. The counter may also be reset to zero when the Off state becomes active, as indicated at lines 4-6.

Line 9 of the generated code 1300 may appear at the evaluation site of the duration operator. Here, the value of the counter, e.g., the 'durationRefCounter' variable, is read and, because the time units are to be in microseconds, the value of the variable is multiplied by 1000. The variable 'SAMPLE_TIME' refers to the time period of execution of the model as determined by the solver at that particular point in the execution of the model. For example, it may be the duration of a single execution step of the model (in seconds) as determined by a fixed-step solver, the delta time between two subsequent executions of the model as determined by a variable-step solver, or for a hardware implementation, the actual clock time duration between two consecutive executions.

Sample Statechart

Figure 14:
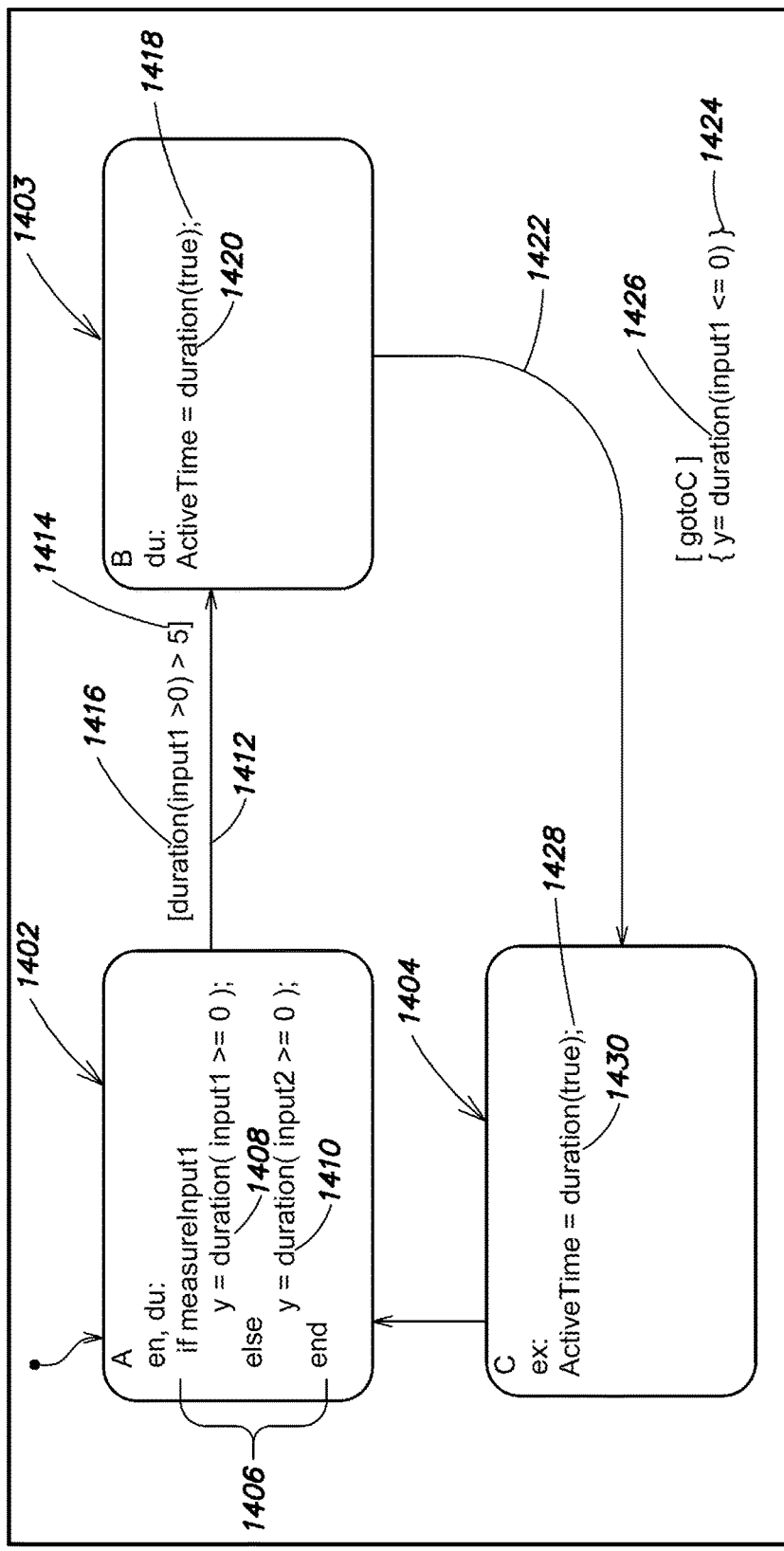
FIG. 14 is a schematic illustration of an executable model in accordance with an embodiment.

FIG. 14 is a schematic illustration of an executable model 1400 in accordance with an embodiment. The model 1400, which is in the form of a statechart, includes a first state (A) 1402, a second state (B) 1403, and a third state (C) 1404. Action statements may be defined for the states 1402-1404 of the model 1400, and these action statements may be performed at different phases of the respective state's execution cycle. As noted, exemplary phases include entry, during, and exit. Actions assigned to a state's entry phase, also referred to as entry actions, may be performed once when a state is entered, e.g., becomes active. Actions assigned to a state's during phase, also referred to as during actions, may be performed while a state is active, for example at every time step of the model. Actions assigned to a state's exit phase, also referred to as exit actions, may be performed once when a state becomes inactive, for example when a transition is taken to another state of the model.

The first state (A) 1402 includes a first action statement 1406 assigned to both the entry (en) and during (du) phases. Thus, it is performed once when the first state (A) 1402 becomes active, and then at every time step of the model 1400, while the first state (A) 1402 remains active. The first statement 1406 is in the form of an if-then-else statement, and includes first and second duration operators 1408 and 1410. As they are included in the first state (A) 1402, the duration operators 1408 and 1410 are bound to the first state 1402. The conditional expression of the first duration operator 1408 tests whether the value of the variable 'input1' is greater than or equal to zero. This expression can be evaluated to True or False. The conditional expression of the second duration operator 1410 tests whether the value of the variable 'input2' is greater than or equal to zero. It too can be evaluated to True or False. The If-then-Else statement 1406 implements the following functionality:

if a measurement of Input1 is available, then the variable y is set to the simulation time that has elapsed while the value of input1 has been greater than or equal to zero, and if a measurement of Input1 is not available, then y is set to the simulation time that has elapsed while the value of input2 has been greater than or equal to zero.

The model 1400 further includes a transition 1412 from the first state (A) 1402 to the second state (B) 1403. The transition 1412 has a label 1414 that specifies a condition for the transition 1412. The label 1414 includes a duration operator 1416 whose condition expression tests whether the value of input1 is greater than zero. The label 1414 thus controls the transition from the first state (A) 1402 to the second state (B) 1403 to occur when the value of input1 has been greater than zero for more than five seconds of elapsed simulation time. As the source state for the transition 1412 is the first state (A) 1402, the duration operator 1416 is bound to the first state (A) 1402.

The second state (B) 1403 includes an action statement 1418 assigned to the state's during (du) phase. Thus, it is performed every time step while the second state 1403 is active. The action statement 1418 also includes a duration operator 1420. As the duration operator 1420 is included in the second state (B) 1403, it is bound to the second state 1403. Rather than specify a conditional expression that, when evaluated, returns True or False, the input argument for the duration operator 1420 is set as True. Accordingly, the action statement 1418 sets the variable 'activeTime' to the simulation time that has elapsed starting when the second state (B) 1403 became active.

The model 1400 includes a transition 1422 from the second state (B) 1403 to the third state (C) 1404. The transition 1422 has a label 1424 that specifies a transition to the third state (C) 1404 on the occurrence of any event within the model, rather than on some specified condition. The label 1424 also includes a duration operator 1426 whose conditional expression tests whether the value of input1 is less than or equal to zero, and sets the variable y to the time that has elapsed while input1 has been less than or equal to zero. The duration operator 1426 included in the label 1424 may be bound to the second state (B) 1403.

The third state (C) 1404 includes an action statement 1428 assigned to the state's exit (ex) phase. Thus, it is performed once when the third state 1404 transitions from active to inactive. The action statement 1428 also includes a duration operator 1430. The duration operator 1430 is bound to the third state (C) 1404. Rather than specify a conditional expression, the input argument of the duration operator 1430 is set as True. The action statement 1428 sets the variable 'activeTime' to the simulation time that has elapsed while the third state (C) 1404 has been active.

The model 1400 also includes a transition 1432 from the third state (C) 1404 to the first state (A) 1402.

FIGS. 15A and 15B are partial views of source code 1500 generated for the model 1400. The source code 1500 may be generated by the code generator 408, and may correspond to the C programming language. It should be understood that the updating the state of a duration operator may refer to the process represented by the generated code 700 (FIG. 7). Line 9 (1502) of the code 1500 updates the state for the first duration operator 1408. Line 10 (1504) updates the state for the second duration operator 1410. Line 11 (1506) updates the state for the third duration operator 1416. Line 13 (1508) checks whether the condition guarding the transition 1412 is satisfied. Line 16 (1510) resets the variable 'condWasTrue' for the fourth duration operator 1420. Line 17 (1512) resets the variable 'condWasTrue' for the fifth duration operator 1426. Line 27 (1514) updates the state for the fourth duration operator 1420. Line 28 (1516) updates the state for the fifth duration operator 1426. Line 32 (1518) implements the action performed for the transition 1422, and corresponds to the evaluation of the duration operator for the transition 1422 and stores the result in the variable y. Line 35 (1520) resets the state for the sixth duration operator 1430. Line 40 (1522) implements the action statement 1428. Line 44 (1524) updates the state for the sixth duration operator 1430. Line 50 (1526) resets the state for the first duration operator 1408. Line 51 (1528) resets the state for the second duration operator 1410. Line 52 (1530) resets the state for the third duration operator 1416.

Lines 67-77 (FIG. 15B) illustrate an implementation of the first duration operator 1408. It should be understood that similar code as lines 67-77 may be generated to implement the second duration operator 1410 with the corresponding condition input2>=0 substituted on line 73, and likewise for the third duration operator 1416 with the condition input1>0.

ADDITIONAL EXAMPLES

A duration operator may be advantageously utilized in models of many different systems.

1. Asymptote Detector

In many control and/or signal processing systems, it may be desirable to determine when a signal, including a noisy signal, reaches a steady state value or condition. The steady state value for a signal that is represented by a curve may be found by determining the curve's asymptote. One way of analyzing such as a signal is to place bounding boxes around the signal, and shrinking the size of the bounding boxes until a final box identifies the asymptote.

Figure 16:
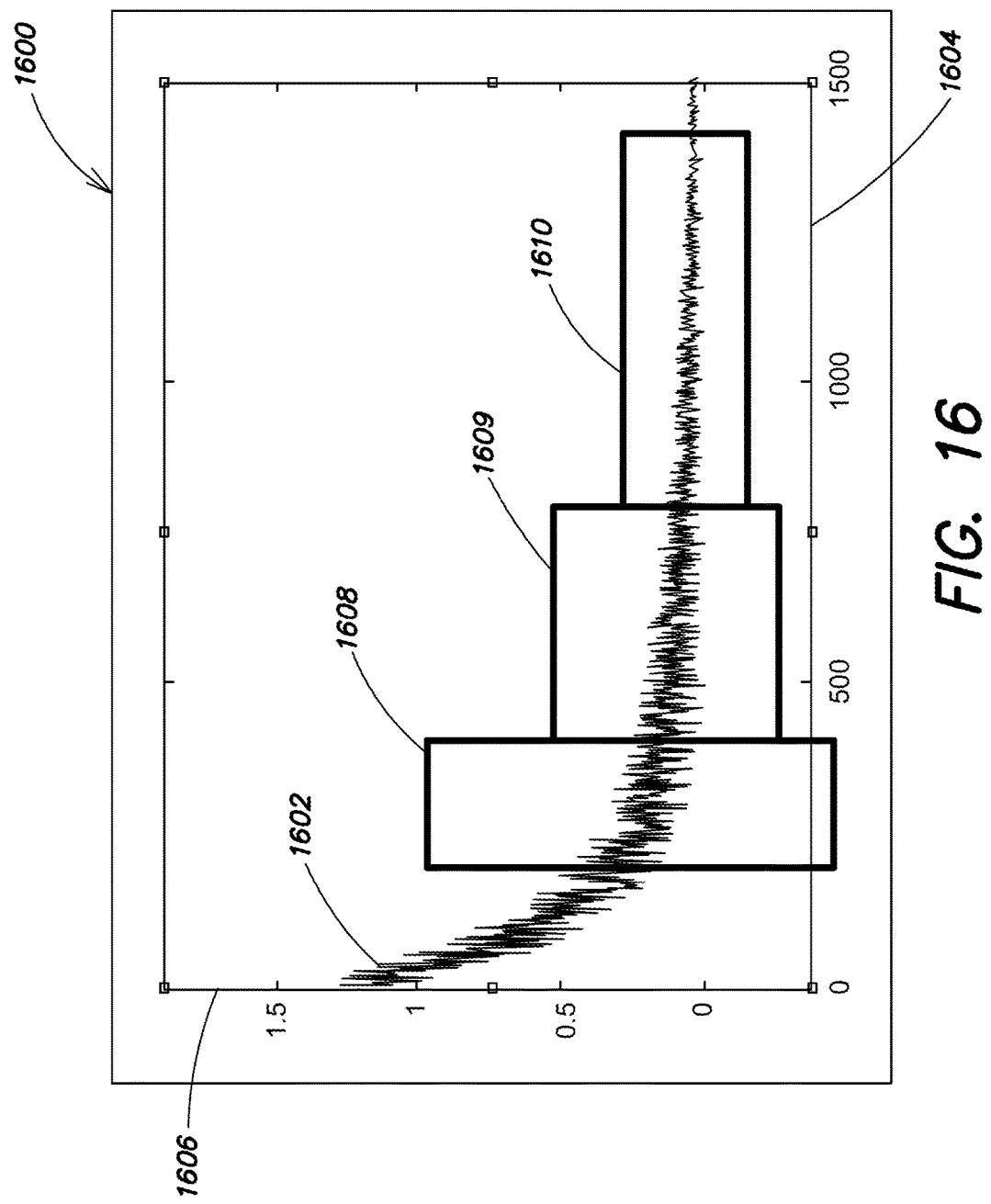
FIG. 16 is a schematic illustration of a plot of a signal in accordance with an embodiment.

FIG. 16 is a schematic illustration of a plot 1600 of a signal 1602. The plot's x-axis 1604 may be time, and the y-axis 1606 may be the signal's amplitude. The signal 1602 may be analyzed by logically placing a series of bounding boxes around the signal 1602, such as bounding boxes 1608-1610. The length of the bounding boxes 1608-1610 are defined on the time domain.

Figure 17:
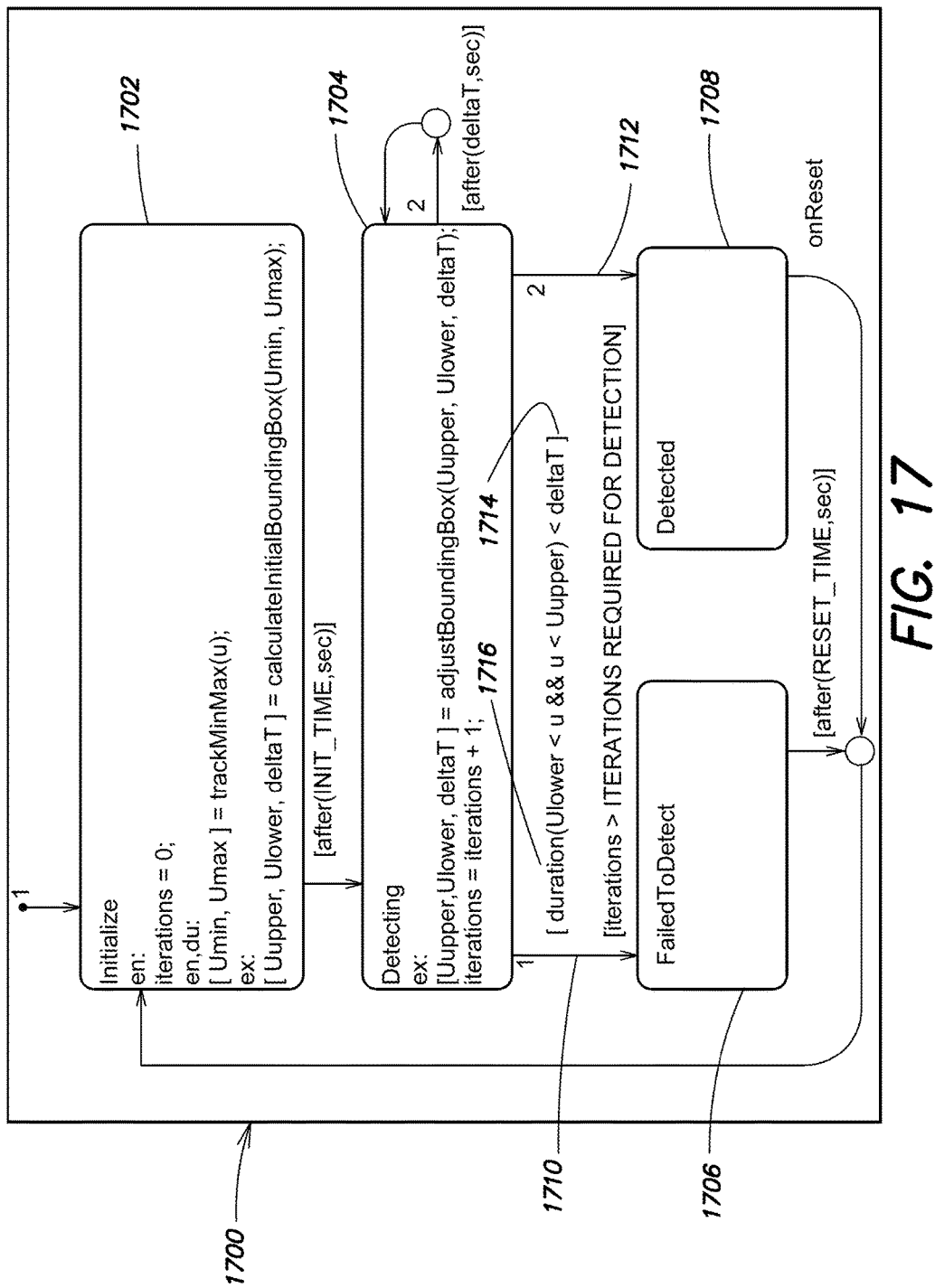
FIG. 17 is a schematic illustration of an executable model in accordance with an embodiment.

FIG. 17 is a schematic illustration of an executable model 1700 implementing a bounding box approach to detecting a signal's asymptote. The model 1700 includes an Initialize state 1702, a Detecting state 1704, a FailedToDetect state 1706, and a Detected state 1708. A first transition 1710 is defined between the Detecting state 1704 and the FailedToDetect state 1706. A second transition 1712 is defined between the Detecting state 1704 and the Detected state 1708. The first transition 1710 is guarded by a statement 1714 that includes a duration operator 1716. The duration operator 1716 verifies that the signal remains inside a respective bounding box 1608-1610 (FIG. 16), depending on the iteration, for the length of time represented by the respective bounding box 1608-1610. If the signal exits a bounding box 1608-1610, then the transition 1710 from the Detecting state 1704 to the FailedToDetect state 1706 is taken. The system then resets and tries again. On the other hand, if the signal remains in the respective bounding box 1608-1610, then the transition 1712 from the Detecting state 1704 to the Detected state 1708 is taken, and the system reports that it has detected an asymptoting signal.

2a. Timed Pattern Recognition

A user may, for example, want to design a system that reacts to a signal only if the signal is True for a certain amount of time. As an example, when a user presses the power button on a computer, while the computer is running, the computer may not immediately shut off or reboot, but may require the user to hold the power button down for a selected amount of time.

Figure 18:
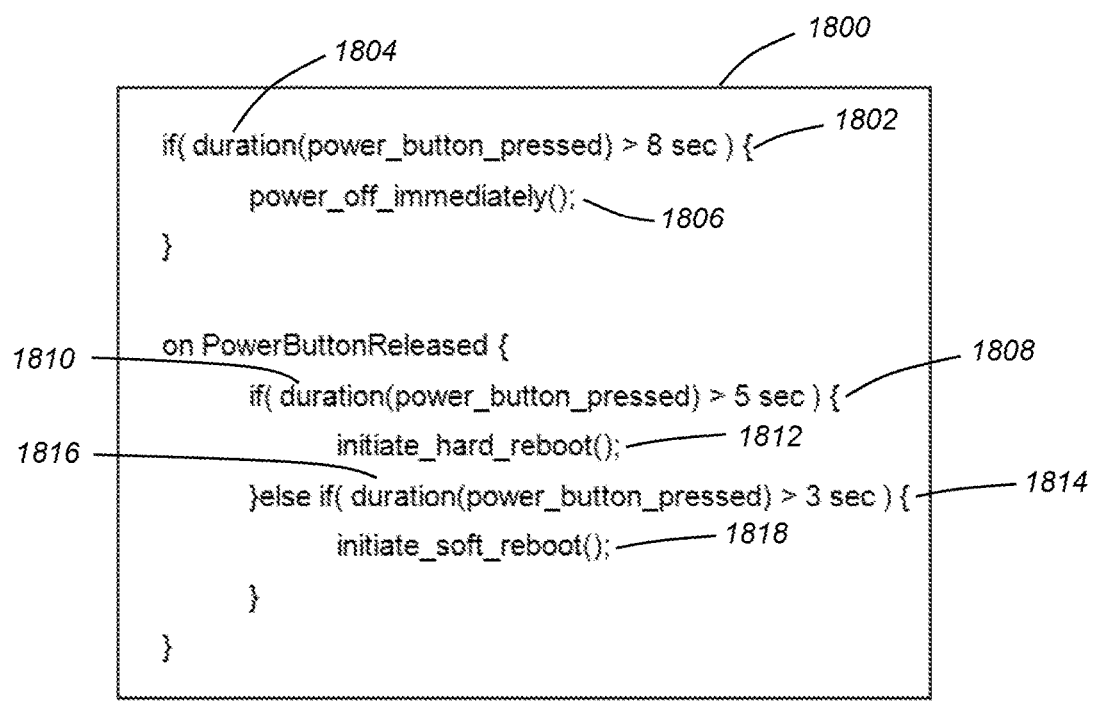
FIG. 18 is a schematic illustration of code.

This functionality may be implemented in a model using the duration operator. FIG. 18 is a schematic illustration of code 1800 that may be included in an executable model. The code 1800 may include a plurality of statements.

A first if statement indicated at 1802 may include a duration operator 1804 having a conditional expression that determines whether the power button has been pressed. The first if statement 1802 may further determine whether the elapsed time as determined by the duration operator 1804 is greater than eight seconds. If so, a function named 'power_off_immediately' as indicated at 1806 is called, which powers off the computer. Additionally, when it is detected that the power button was released, a second if statement indicated at 1808 may determine whether the power button had been pressed for more than five seconds through a duration operator 1810. If so, a function named 'initiate_hard_reboot' as indicated at 1812 may be called, and a hard boot of the computer may be performed. Otherwise, an else if statement indicated at 1814 may determine whether the power button had been pressed for more than three seconds through a duration operator 1816. If so, a function named 'initiate_soft_reboot' as indicated at 1818 may be called, and a soft reboot of the computer may be performed.

2b. Timed Pattern Recognition

A user may want to design a security system that requires a combination key presses to be maintained for a specific amount of time. The security system may have the following requirement:

Press Key1 and hold for 5 seconds
After 5 seconds press Key2 and hold for 3 seconds while still holding down Key1

Figure 19:
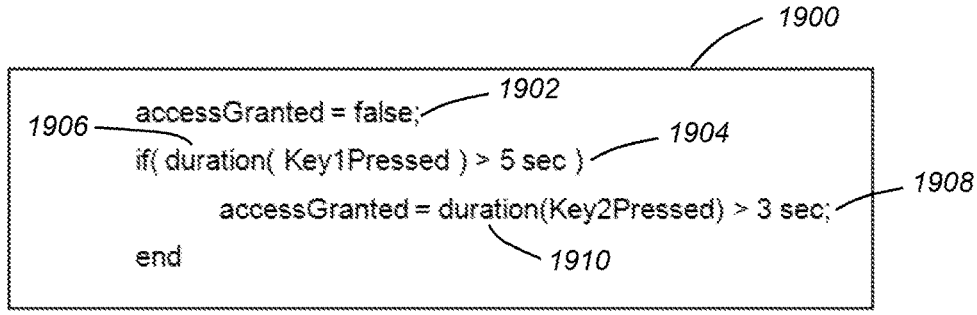
FIG. 19 is a schematic illustration of code.

An executable model of such a security system may be created. FIG. 19 is a schematic illustration of code 1900 that may be included in an executable model. The code 1900 may include a plurality of statements.

A first statement 1902 may set a variable called 'accessGranted' to False. An if statement indicated at 1904 may determine whether Key1 has been pressed for more than five seconds. The if statement 1904 may include a duration operator 1906 whose condition is whether Key1 is pressed. If it is determined that Key1 has been pressed for more than five seconds, then a statement indicated at 1908 may set the 'accessGranted' variable to True if Key2 is pressed for more than three seconds. The statement 1908 may include a duration operator 1910 whose condition is whether Key2 is pressed.

3. Spatial Pattern Recognition

As noted, a duration operator may be utilized in other domains besides time. For example, a duration operator may be utilized to track distance rather than time. An example is a cruise control system for a car that shuts off when the car has departed the current lane.

Figure 20:
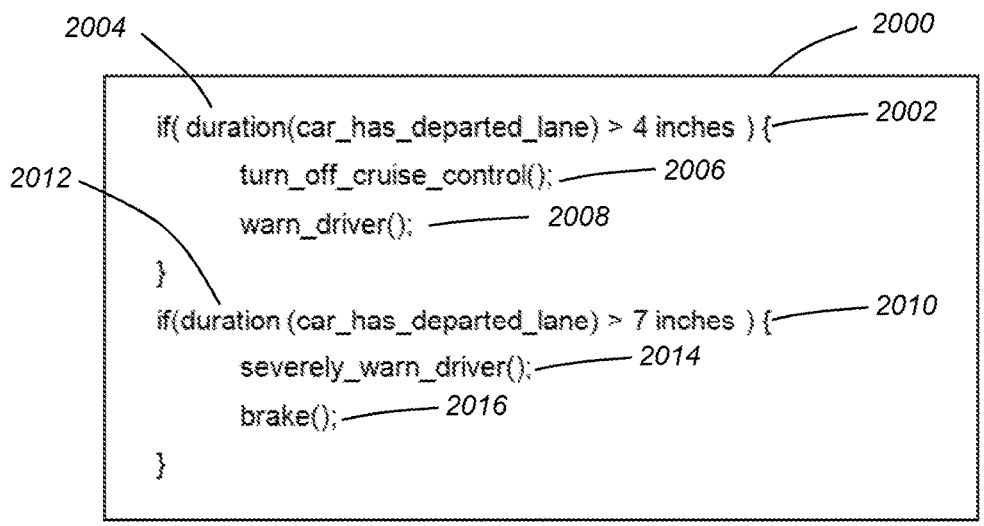
FIG. 20 is a schematic illustration of code.

This functionality may be implemented in a model. FIG. 20 is a schematic illustration of code 2000 that may be included in an executable model. The code may include a plurality of statements.

The code 2000 may include a first if statement 2002 that determines whether the car has departed from its lane more than four inches. The first if statement 2002 may include a duration operator 2004 whose conditional expression checks whether the car has departed its lane. If it is determined that the car has departed its lane, then the duration operator 2004 evaluates to the distance traveled from the point of lane departure. The distance units of the duration operator 2004 may be the same as that defined in the domain, e.g., inches. Nonetheless, other units may be used, such as feet, meters, etc. If the car has not departed its lane, the duration operator 2004 evaluates to zero. If the car has departed its lane by more than four inches, two functions may be called. A first function 2006 named 'turn_off_cruise_control' may turn off the cruise control system. A second function 2008 named 'warn_driver' may cause one or more visual and/or aural warnings to be issued to the driver. A second if statement 2010 of the code 2000 may determine whether the car has departed from its lane more than seven inches. The second if statement 2010 may include a duration operator 2012 having the same conditional expression as the duration operator 2004 of the first if statement 2002. If the duration operator 2012 evaluates to a distance of greater than seven inches, i.e., the distance traveled exceeds seven inches, then two functions may be called. A first function 2014 named 'severely_warn_driver' may cause one or more visual and/or aural warnings to be issued to the driver. A second function 2016 named 'brake' may cause the car's brakes to be applied.

4. Test Assessment

A duration operator also may be utilized when defining assessments for an executable model. Assessments may be used to determine whether a model meets one or more specifications established for the model or the system being represented by the model.

For example, a model may include a plurality of states, such as a Wait state, a SendRequest state, a WaitForRequest state, and an InterpretResult state. A specification for such a model may state that the SendRequest state should only be active for less than five seconds, and the WaitForRequest state should only be active for less than 15 seconds. A user may include statements in the model that test for these assessments during execution of the model.

Figure 21:
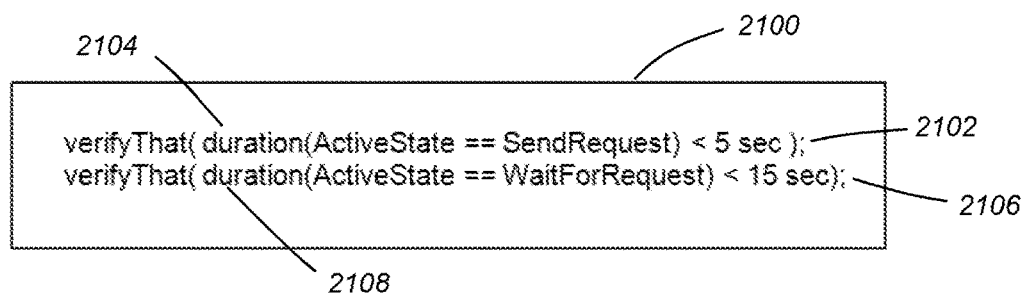
FIG. 21 is a schematic illustration of code.

FIG. 21 is a schematic illustration of code 2100 that may be included in an executable model. The code 2100 may include a plurality of statements. The code 2100 may include a first statement 2102 that determines whether the SendRequest state of the model has been active for less than five seconds. The first statement 2102 may include a duration operator 2104 whose conditional expression determines whether the SendRequest state is active. A second statement 2106 may determine whether the WaitForRequest state has been active for less than 15 seconds. The second statement 2106 may include a duration operator 2108 whose conditional expression determines whether the WaitForRequest state is active.

5. Hysteresis/Bang-Bang Controller

Many systems use a type of controller known as a hysteresis or bang-bang controller. Models of such controllers may be included in models of such systems. For example, suppose a user is designing a controller for a heater. The controller may be required to implement the following functionality. If the heater is off, and the temperature of the space or object being heated drops below a low value (L) and remains below L for a specified time (T) in seconds, then the controller should turn on the heater, and keep the heater on until the temperature of the space or object rises above a high level (H), and stays above H for the specified time (T).

Figure 22:
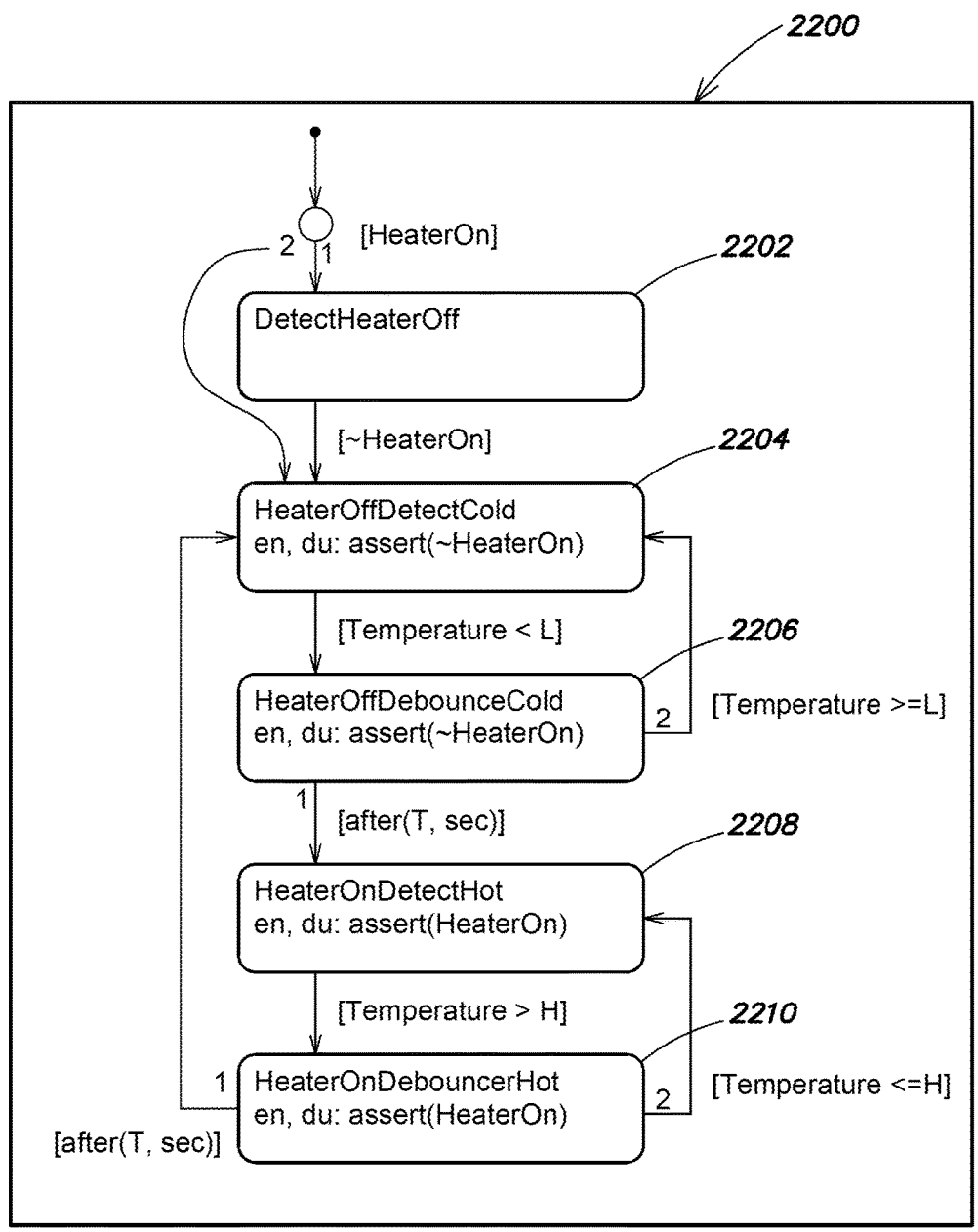
FIG. 22 is a schematic illustration of an executable model in accordance with an embodiment.

FIG. 22 is a schematic illustration of an executable model 2200 of a controller. The model 2200 does not use any duration operators. The model 2200 includes a DetectHeaterOff state 2202, a HeaterOffDectectCold state 2204, a HeaterOffDebounceCold state 2206, a HeaterOnDetectHot state 2208, and a HeaterOnDebounceHot state 2210. The model 2200 requires two states, the HeaterOffDectectCold state 2204 and the HeaterOffDebounceCold state 2206, to implement the heater off-to-on functionality. The model 2200 also requires two other states, the HeaterOnDetectHot state 2208 and the HeaterOnDebounceHot state 2210, to implement the on-to-off functionality.

Figure 23:
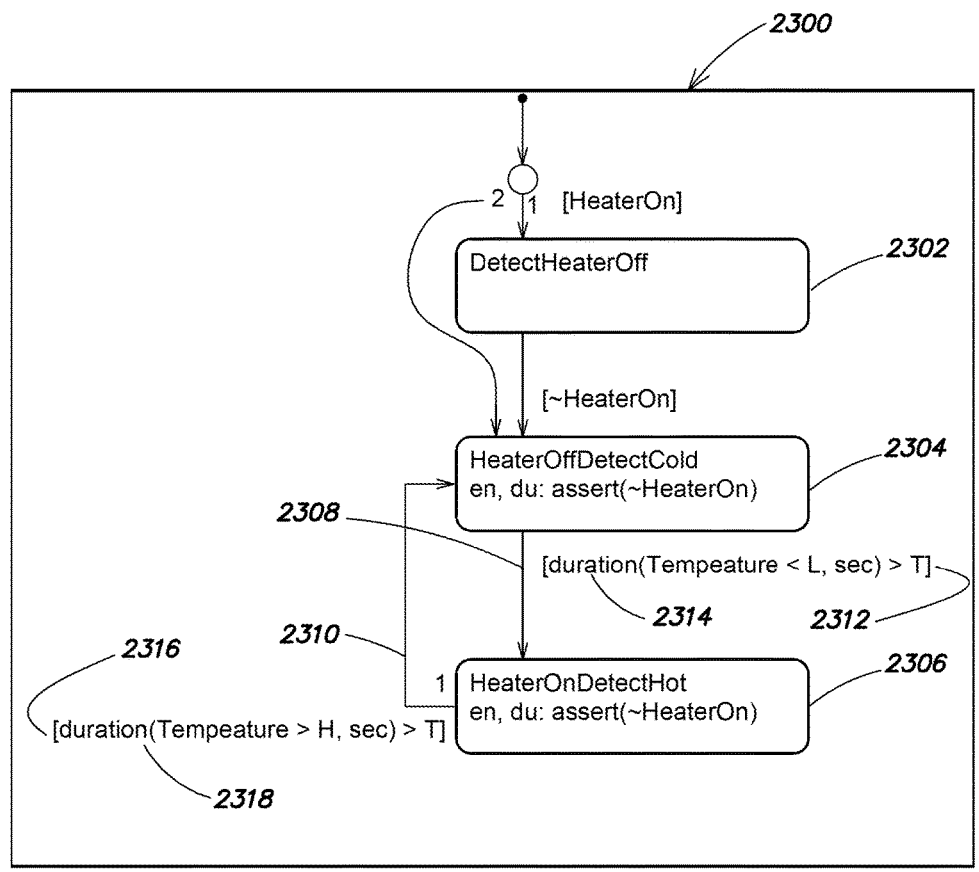
FIG. 23 is a schematic illustration of an executable model in accordance with an embodiment.

FIG. 23 is a schematic illustration of an executable model 2300 of a controller. The model 2300 includes a DetectHeaterOff state 2302, a HeaterOffDetectCold state 2304, and a HeaterOnDetectHot state 2306. The model 2300 also includes a first transition 2308 from the HeaterOffDetectCold state 2304 to the HeaterOnDetectHot state 2306, and a second transition 2310 from the HeaterOnDetectHot state 2306 to the HeaterOffDetectCold state 2304. The first transition 2308 is guarded by a first statement 2312 having a first duration operator 2314. The second transition 2310 is guarded by a second statement 2316 having a second duration operator 2318. The first duration operator 2314 causes the model 2300 to transition from the HeaterOffDetectCold state 2304 to the HeaterOnDetectHot state 2306, when the temperature has been below the low value (L) for more than T seconds. The second duration operator 2318 causes the model 2300 to transition from the HeaterOnDetectHot state 2306 to the HeaterOffDetectCold state 2304, when the temperature has been above the high value (H) for more than T seconds.

Comparing FIGS. 22 and 23, it may be seen that the duration operator of the present disclosure may result in a model having fewer states as compared to a model having the same behavior but not including duration operators. For example, the use of duration operators may result in a model including three states as illustrated in FIG. 23 as compared to five states as illustrated in FIG. 22. By reducing the number of states required to implement the behavior or functionality of a desired controller, the duration operator may result in a model that executes more efficiently, for example requires fewer processing, memory, and/or I/O resources. Furthermore, code generated for the model 2300 may be more efficient than code generated for the model 2200. For example, code generated for the model 2300 may have fewer lines than code generated for the model 2200. Accordingly, code generated for the model 2300 may execute more efficiently, e.g., faster, with fewer memory resources, and/or with fewer I/O resources.

6. Test Harness

A duration operator of the present disclosure also may be used when creating executable test models or components that may be used to test a model of a device under test (DUT).

Figure 24:
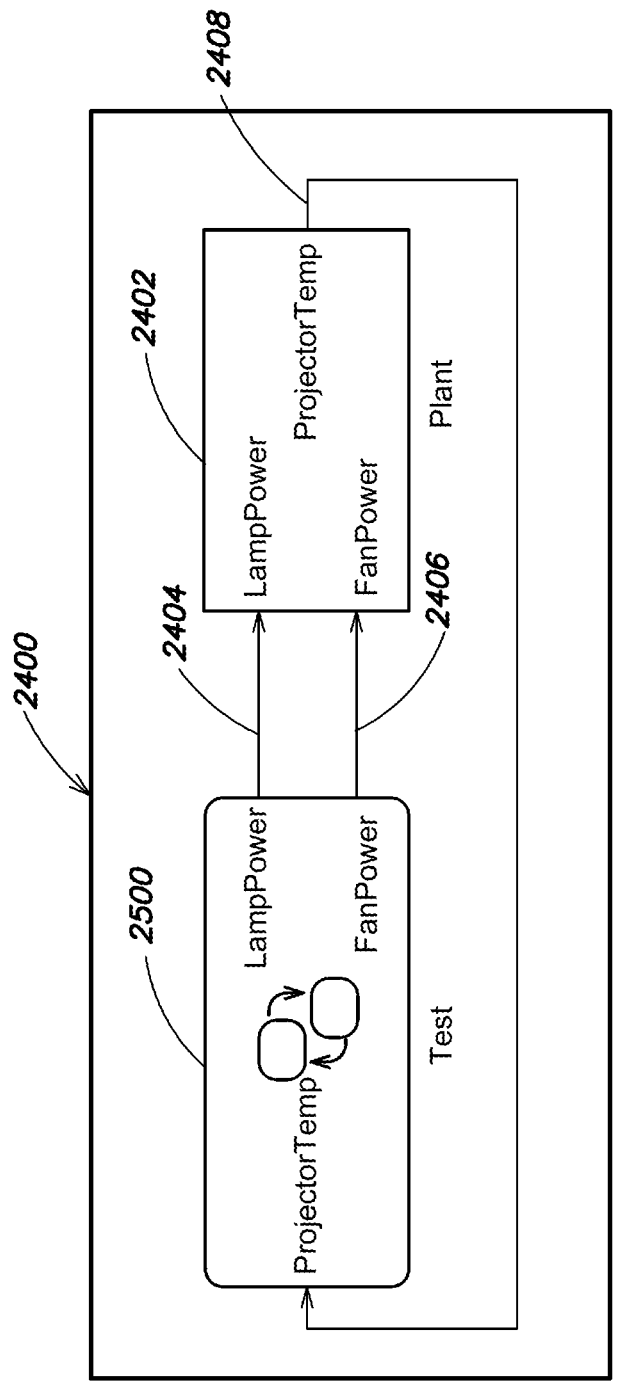
FIG. 24 is a schematic illustration of an executable model in accordance with an embodiment.

FIG. 24 is a schematic illustration of an executable model 2400. The model 2400 may include a first component 2402 that models a DUT, such as a video projector. The first component 2402 may receive a first input signal 2404 representing a lamp power value, and a second input signal 2406 representing a fan power value. The first component 2402 may also generate a first output signal 2408 representing a projector lamp temperature. The model 2400 may further include a second component 2500 for testing the first component 2402. For example, the second component 2500 may receive the output signal 2408 of the first component 2402, and may generate sample values for the first and second input signals 2404 and 2406 of the first component 2402.

Figure 25:
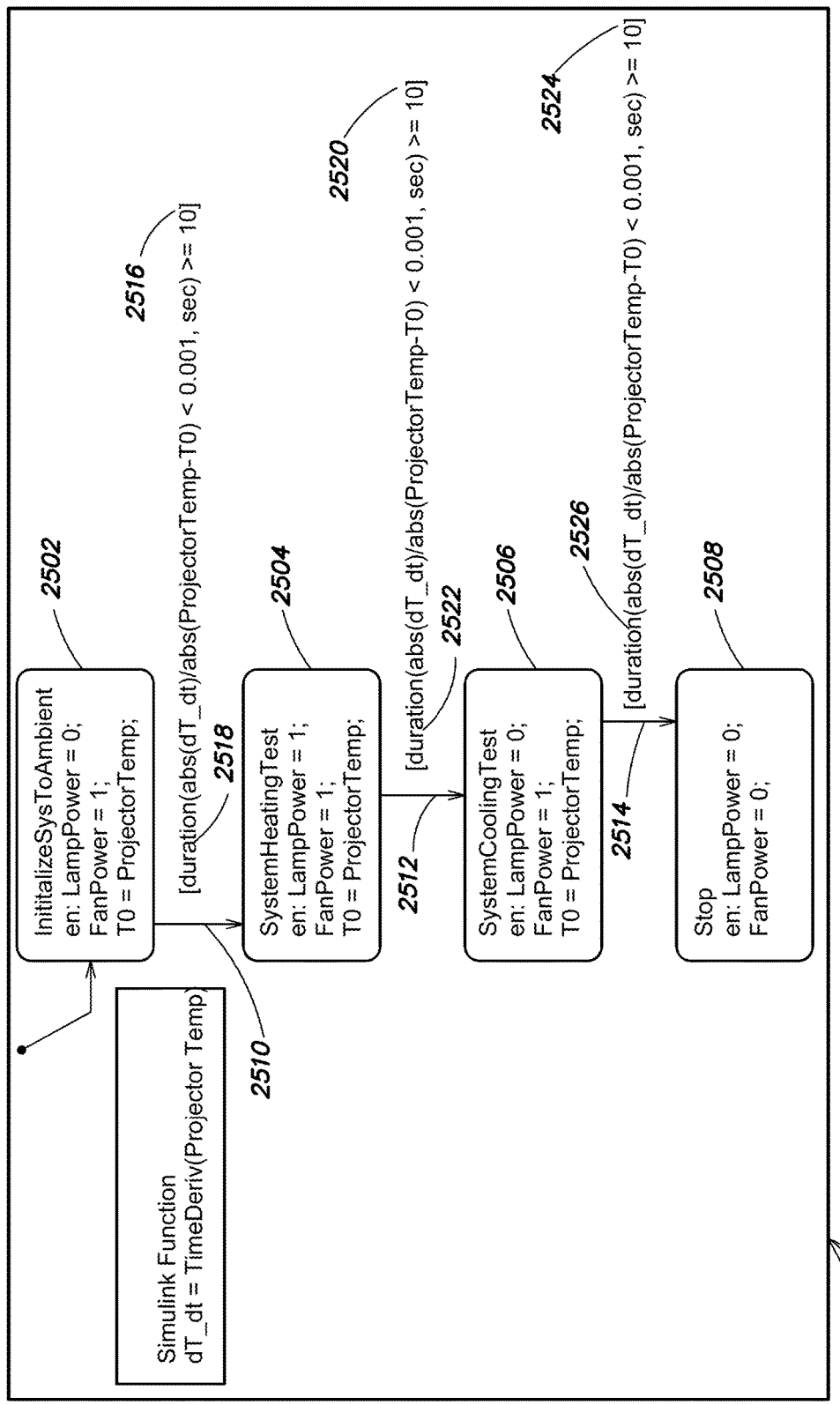
FIG. 25 is a schematic illustration of a component of the model of FIG. 24 in accordance with an embodiment.

FIG. 25 is a schematic illustration of the second component 2500. The second component 2500 may include an InitializeSysToAmbient state 2502, a SystemHeatingTest state 2504, a SystemCoolingTest state 2506, and a Stop state 2508. The second component 2500 also may include a first transition 2510 from the InitializeSysToAmbient state 2502 to the SystemHeatingTest state 2504, a second transition 2512 from the SystemHeatingTest state 2504 to the SystemCoolingTest state 2506, and a third transition 2514 from the SystemCoolingTest state 2506 to the Stop state 2508. The first transition 2510 may be guarded by a first statement 2516 having a first duration operator 2518. The second transition 2512 may be guarded by a second statement 2520 guarded by a second duration operator 2522. The third transition 2514 may be guarded by a third statement 2524 guarded by a third duration operator 2526.

The duration operators 2518, 2522, and 2526 may detect a steady state in the temperature to within an acceptable margin of error. For example, the first duration operator 2518 may detect when the mixing of air from the fan causes the projector temperature to reach equilibrium with the air temperature in the room for at least ten seconds. In particular, the conditional expression of the first duration operator 2518 may determine whether the rate of change of the projector temperature divided by the difference between the protector temperature and the ambient temperature is less than 0.001, and the first duration operator 2518 may determine whether the conditional expression has been True for ten or more seconds. The second duration operator 2522 may detect an acceptable steady state temperature after the lamp has been turned on. The third duration operator 2526 may detect an acceptable steady state after the lamp has been turned off. The second and third duration operators 2522 and 2526 may include the same conditional expression as the first duration operator 2518.

In some embodiments, a duration operator may be implemented graphically. For example, a duration operation may be implemented in a model element, such as a block of a block diagram model.

Figure 26:
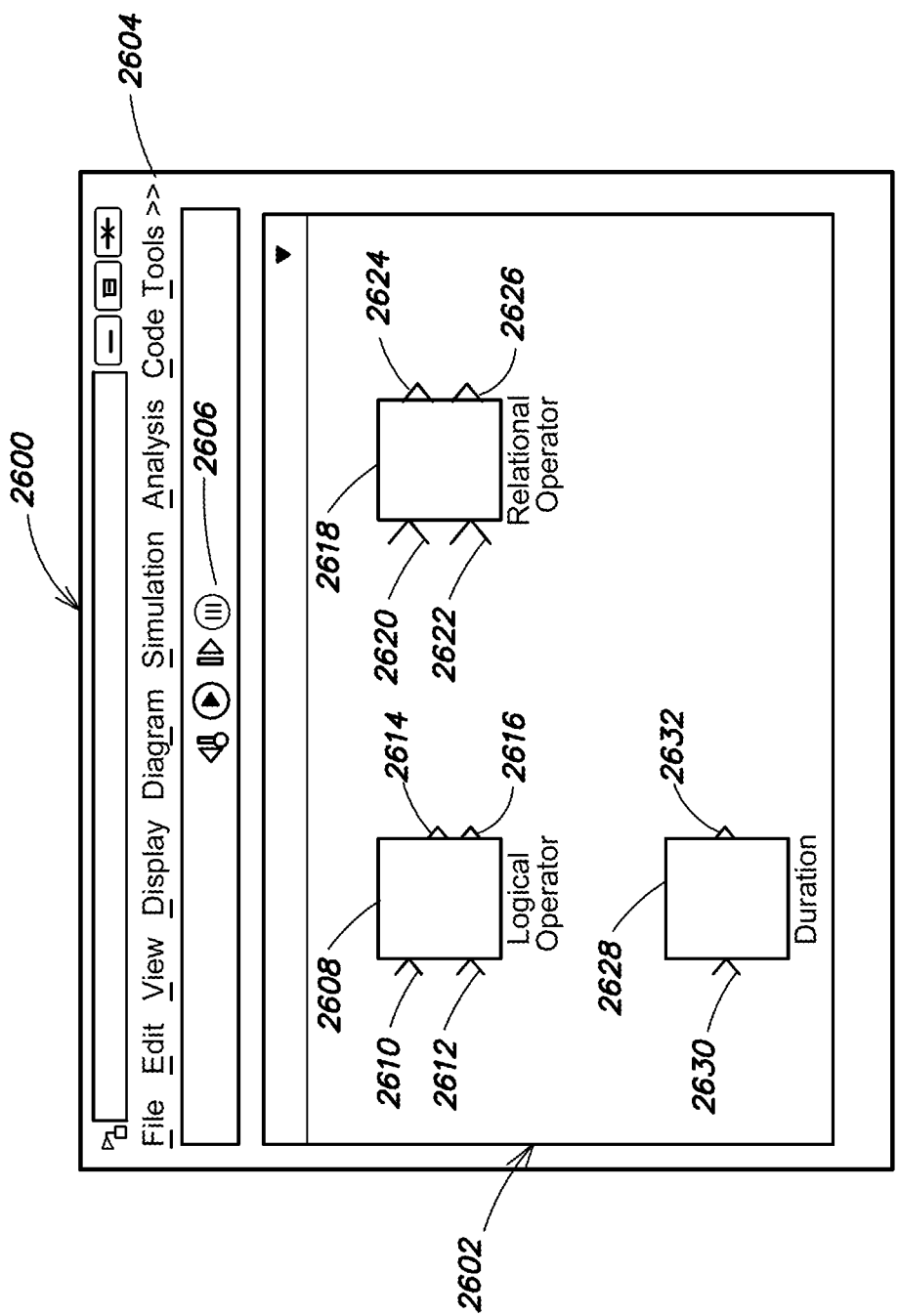
FIG. 26 is a schematic illustration of a model editor window illustrating model elements.

FIG. 26 is a schematic illustration of a model editor window 2600, which may be generated by the user interface engine 402 (FIG. 4). The model editor window 2600 may include a model canvas 2602, a toolbar 2604, and a command bar 2606, among other user interface elements, and may be operated by a user. For example, a user may operate the model editor window 2600 to open, create, edit, and save a graphical model. The graphical model may be presented within the model canvas 2602 portion of the model editor window. The modeling environment 400 may include a plurality of predefined model element types, and a user may construct or edit a model by selecting desired model element types. In response, instances of the selected model element types may be added to the graphical model.

The modeling environment 400 may include a logical operator model element or block 2608, and one or more logical operator blocks may be included in a model. The logical operator block 2608 may perform a specified logical operation, such as AND, OR, NAND, NOR, etc. The particular logical operation performed by the logical operator block 2608 may be selected by a user, for example by opening a dialog box associated with the logical operator block 2608, and selecting the desired operation. The logical operator block 2608 may include first and second input ports 2610 and 2612. The input ports 2610 and 2612 may be coupled to other model elements of a model, and the logical operator block 2608 may receive input values, such as True or False, on the first and second input ports 2610 and 2612 during execution of the model. The logical operator block 2608 also may include first and second output ports 2614 and 2616. The result of the logical operation performed by the logical operator block 2608, e.g., True or False, may be output on the first output port 2614.

In an embodiment, the logical operator block 2608 also may include a duration operator. The duration operator may determine the elapsed simulation time for which the output of the logical operator block 2608 has been True or False, for example as selected by a user for the particular instance of the logical operator block 2608 in a model. The elapsed simulation time may be output by the logical operator block 2608 on the second output port 2616. The second output port 2616 may be connected by a connection element, such as a wire, arrow, etc., to the input of one or more other blocks, which may utilize the elapsed simulation time, for example in the performance of that other block's function. For example, the elapsed simulation time as computed by the duration operator of the logical operator block 2608 may be provided to a Scope block for display to a user, to another logical operation block to be compared to a time limit, e.g., to trigger execution of a portion of the model that should only run after the time limit, or to another block of the model.

The modeling environment 400 also may include a relational operator model element or block 2618, and one or more relational operator blocks may be included in a model. The relational operator block 2618 may perform a specified comparison, such as equal to, not equal to, less than, less than or equal to, greater than, or greater than or equal to. The particular relational operation performed by the relational operator block 2618 may be selected by a user, for example by opening a dialog box associated with the relational operator block 2618, and selecting the desired operation. The relational operator block 2618 may include first and second input ports 2620 and 2622. The input ports 2620 and 2622 may be coupled to other model elements of a model, and the relational operator block 2618 may receive input values, such as numeric values, on the first and second input ports 2620 and 2622 during execution of the model. The relational operator block 2618 also may include first and second output ports 2624 and 2626. The result of the relational operation performed by the relational operator block 2618 may be output on the first output port 2624.

In an embodiment, the relational operator block 2618 may include a duration operator. The duration operator may determine the elapsed simulation time for which the output of the relational operator block 2618 has been True or False, for example as selected by a user for the particular instance of the relational operator block 2618. The elapsed simulation time may be output by the relational operator block 2618 on the second output port 2626. The second output port 2626 may be connected by a connection element to the input of one or more other blocks, which may utilize the elapsed simulation time, for example in the performance of that block's function.

Alternatively or additionally, the modeling environment 400 may include a duration model element or block 2628, and one or more duration blocks may be included in a model. The duration block 2628 may include one or more input ports, such as input port 2630, and one or more output ports, such as output port 2632. The duration block 2628 may implement the functionality of a duration operator in a model. For example, a user may specify a domain, such as simulation time, and a conditional expression for the duration block 2628. The conditional expression may utilize the value received on the input port 2630. For example, the conditional expression may determine whether the input value equals a specified value, exceeds a threshold, is below a ceiling value, etc. It should be understood that the conditional expression may utilize zero, one, or more input values. In an embodiment, a dialog box or other graphical affordance may be presented, for example in response to selecting the duration block 2628. A user may specify the domain and the conditional expression within the dialog box. During execution of a model that includes the duration block 2628, the conditional expression associated with the duration block 2628 may be evaluated. If the conditional expression evaluates to True, the duration block 2628 may begin tracking the elapsed simulation time, and the elapsed simulation time may be output by the duration block 2628 on the output port 2632. The output port 2632 may be connected to the input of one or more other blocks, and the one or more other blocks may utilize the elapsed simulation time, for example in the performance of the functions implemented by the one or more other blocks.

It should be understood that the logical operator block 2608, the relational operator block 2618, and the duration block 2628 are meant for illustrative purposes, and that a duration operator may be implemented in other model elements.

In some embodiments, a duration operator may be bound to an expression defined in a model. The duration operator may be defined to track the elapsed simulation time for which the expression evaluates to a given value, during execution of the model. The elapsed simulation time, as determined by the duration operator, may be made available to other portions of the model and/or presented to a user. For example, the elapsed time may be displayed in a tool tip or other graphical affordance when the user hovers a pointer over the expression. It should be understood that the elapsed time may be presented in other ways, for example the elapsed time may be presented in a pop up window associated with the expression during execution of the model.

An executable model may include one or more conditionally executed portions. For example, a model may include one more conditional subsystems. Execution of a conditional subsystem may occur in response to the value of a control signal that may be connected to the conditionally executed subsystem. Exemplary control signals for conditional subsystems include: an enable control signal, which may cause an enabled subsystem to execute when the enable control signal is positive; a triggered control signal which may cause a triggered subsystem to execute when a trigger event occurs; and a control flow signal which may cause a control flow subsystem to execute under the control of another element of the model, such as a control block.

In some embodiments, a duration operator may be bound to a conditional subsystem. The duration operator may be evaluated when the conditional subsystem is active, for example in response to the control signal. The duration operator may be evaluated at each simulation time step while the conditional subsystem to which it is bound is active. It should be understood that the duration operator may be evaluated at some other frequency or occurrence. If the conditional subsystem is active and the conditional expression of the duration operator evaluates to True, the duration operator may begin tracking elapsed simulation time. When the conditional subsystem becomes inactive and/or the conditional expression evaluates to False, the duration operator may stop tracking elapsed time.

Figure 27:
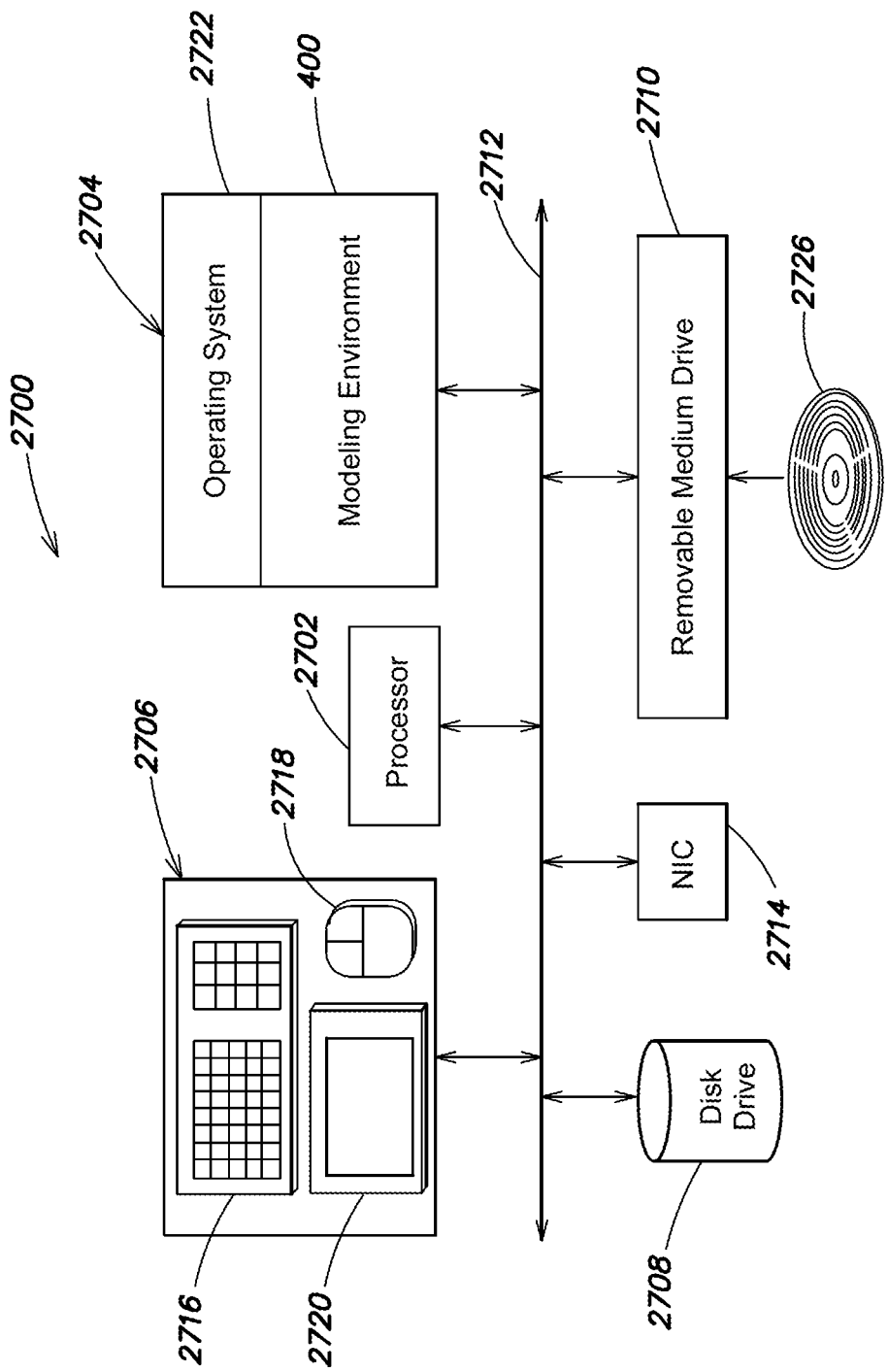
FIG. 27 is a schematic illustration of a data processing system in accordance with an embodiment.

It should be understood that a duration operator may be deemed to be bound to a conditional subsystem in a number of ways. For example, if a duration operator is included within a conditional subsystem, then the duration operator may be bound to that conditional subsystem. Also, a duration operator that shares an input or output, e.g., data or control input, with a conditional subsystem may be bound to that conditional subsystem. Furthermore, a duration operator that is not included within a conditional subsystem or that shares an input or output may still be bound to a conditional subsystem through an explicit designation, association, or assignment. Illustrative Data Processing System FIG. 27 is a schematic illustration of a computer or data processing system 2700 for implementing an embodiment of the disclosure. The computer system 2700 may include one or more processing elements, such as a processor 2702, a main memory 2704, user input/output (I/O) 2706, a persistent data storage unit, such as a disk drive 2708, and a removable medium drive 2710 that are interconnected by a system bus 2712. The computer system 2700 may also include a communication unit, such as a network interface card (NIC) 2714. The user I/O 2706 may include a keyboard 2716, a pointing device, such as a mouse 2718, and a display 2720. Other user I/O 2706 components include voice or speech command systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 2704, which may be a Random Access Memory (RAM), may store a plurality of program libraries or modules, such as an operating system 2722, and one or more application programs that interface to the operating system 2722, such as the modeling environment 400, including the code generator 200. One or more objects or data structures may also be stored in the main memory 2704, such as models 200, 1400, 1700, 2200, 2300, and 2400.

The removable medium drive 2710 may accept and read a computer readable media 2726, such as a CD, DVD, floppy disk, solid state drive, tape, flash memory or other medium. The removable medium drive 2710 may also write to the computer readable media 2726.

Suitable computer systems include personal computers (PCs), workstations, servers, laptops, tablets, palm computers, smart phones, electronic readers, and other portable computing devices, etc. Nonetheless, those skilled in the art will understand that the computer system 2700 of FIG. 27 is intended for illustrative purposes only, and that the present disclosure may be used with other computer systems, data processing systems, or computational devices. The present disclosure may also be used in a networked, e.g., client-server, computer architecture, or a public and/or private cloud computing arrangement. For example, the modeling environment 400 may be hosted on a server, and accessed by a remote client through an application hosting system, such as the Remote Desktop Connection tool from Microsoft Corp.

Suitable operating systems 2722 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 2722 may provide services or functions for other modules, such as allocating memory, organizing data according to a file system, prioritizing requests, etc. The operating system 2722 may run on a virtual machine, which may be provided by the data processing system 2700.

As indicated above, a user or developer, such as an engineer, scientist, programmer, etc., may utilize one or more input devices, such as the keyboard 2716, the mouse 2718, and the display 2720 to operate the modeling environment 400, and construct one or more models, such as the models 200, 1400, 1700, 2200, 2300, and 2400. As discussed, the models may be computational and may have executable semantics. In particular, the models may be simulated or run. In particular, the models may provide one or more of time-based, event-based, state-based, message-based, frequency-based, control-flow based, and dataflow-based execution semantics. The execution of a model may simulate operation of the system that is being designed or evaluated.

In some embodiments, the disclosure may refer to a modeling environment, the modeling environment being adapted to:
a) receive a first user inputs from a user;
b) create a state-based model in accordance with the first user input, the state-based model comprising at least a first state and a second state as well as at least one transition connecting the first state with the second state;
c) receive a second user inputs from a user, the second input specifying a condition and a duration;
d) associate the condition and the duration to the at least one transition; and
e) generate code which will allow a transition from the first state to the second state if the condition associated the at least one transition is True for a time interval that is greater than or equal to the given duration, wherein the code is such that the state-based model remains in the first state until the condition is True for a time interval that is equal to the duration.

In some embodiments, entry/during/exit sections of a state and transition conditions may be translated to functions, e.g., in the C programming language. The current state may be maintained in a variable. At each time-step of the model, an execution may begin at a designated main (chart-entry) function, which may consist of a series of conditionals, e.g., a switch-statement in C, that determine which state section functions to be run for example based on the current state variable, which transition conditions to be evaluated, and, if a transition is to be taken, which state section should be run in the next time-step (i.e., updating the current state variable). Standard optimization techniques may then be applied, e.g., to inline functions into the main function (as demonstrated in FIGS. 15A and 15B).

With reference to FIGS. 1 and 2, since each state section and transition condition may be translated to a function, there may be many more functions created for the model of FIG. 1, at least initially. For example, three more states, namely Debounce, Debounce.Off, Debounce.On, may be created, and four more transitions, namely two pairs of [sw<0], [sw>=0], may be created as compared to FIG. 2.

As it may only need one numeric variable per duration call, a duration operator may not need any additional data structures. For example, calls to "duration( . . . )" in a model may be found, and rewritten according to a selected code-generation pattern, without any additional bookkeeping other than usage error checks (e.g., the variable name may automatically be made unique by the code-generation framework). Furthermore, there may be an additional advantage in that, because a duration operator may take only one condition, it is not possible to mistakenly provide incorrect conditions, e.g., [sw<0] and [sw>0] missing the sw==0 case).

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 2700. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, the duration operator may be utilized in other modeling domains, such as event-based and/or message-based modeling domains. Therefore, it is the object of the appended claims to cover all such variations and modifications as come within the true spirit and scope of the disclosure.

What is claimed is:

1. A method comprising:
   for a model having executable semantics, the model including
      either a state machine that includes a state and an action statement or a portion that is conditionally executed,
      a domain that increases monotonically during execution of the model, and
      a duration operator that includes a conditional expression that evaluates to True or False, wherein the duration operator is either associated with the state or bound to the conditionally executed portion of the model;
   during execution of the model, evaluating, by one or more processors, the conditional expression of the duration operator when either the state becomes active or the conditionally executed portion of the model becomes active;
   tracking, by the one or more processors, an elapsing of the domain beginning when the conditional expression associated with the duration operator evaluates to True; and
   at least one of
      utilizing the elapsed domain in the model, or
      displaying the elapsed domain, and wherein
      the model simulates a control system, a communication system, or a factory automation system,
      code for the model simulates or operates the control system, the communication system, or the factory automation system, and
      the inclusion of the duration operator in the model results in the code including fewer lines of code, using fewer memory resources, or using fewer input/output (I/O) resources than corresponding code for the model without including the duration operator.

2. The method of claim 1 wherein the monotonically increasing domain is a simulation time over which the model is executed, the method further comprising:
   assigning the elapsed simulation time to a variable of the model, wherein the variable is utilized in the action statement.

3. The method of claim 1 wherein the monotonically increasing domain is a simulation time over which the model is executed, the method further comprising:
   determining when the state becomes inactive; and
   resetting the elapsed simulation time when the state becomes inactive.

4. The method of claim 1 wherein the monotonically increasing domain is a simulation time over which the model is executed and the elapsed simulation time is tracked starting from zero or a previously retained value.

5. The method of claim 1 wherein
   the model further includes
      a second state, and
      a transition from the state to the second state, and
   the action statement guards the transition from the state to the second state.

6. The method of claim 1 wherein the state is executed at a plurality of time steps when the state is active.

7. The method of claim 6 wherein the evaluating the conditional expression occurs at each of the plurality of time steps that the state is executed.

8. The method of claim 1 wherein the action statement is associated with (1) one or more execution phases of the state or (2) a transition from the state.

9. The method of claim 1 wherein the monotonically increasing domain is a simulation time over which the model is executed and the simulation time is in a first unit of measure, the method further comprising:
   applying one or more transforms to change the elapsed simulation time from the first unit of measure to a second unit of measure.

10. The method of claim 1 wherein the model is executed over a plurality of time steps, the plurality of time steps determined by a continuous-time solver, the method further comprising:
    detecting when a zero crossing of the conditional expression of the duration operator has occurred; and
    utilizing the zero crossing by the continuous-time solver to alter at least one of a frequency or a step size of the plurality of time steps.

11. The method of claim 1 wherein the monotonically increasing domain is a simulation time over which the model is executed, the method further comprising:
    generating code for the model, wherein the generated code for the duration operator is clock-based.

12. The method of claim 11 wherein the generated code includes one or more statements for obtaining a current simulation time of the model.

13. The method of claim 11 wherein the generated code utilizes actual time.

14. The method of claim 1 further comprising:
    generating code for the model, wherein the generated code for the duration operator is counter-based, wherein the generated code includes an operation for incrementing a variable associated with the duration operator.

15. The method of claim 1 wherein the monotonically increasing domain is a simulation time over which the model is executed, the method further comprising:
    stopping the tracking of elapsed simulation time when the conditional expression associated with the duration operator evaluates to False;
    retaining a last value of elapsed simulation time when the tracking is stopped; and
    resuming the tracking of elapsed simulation time from the last value when the conditional expression associated with the duration operator next evaluates to True.

16. The method of claim 1 wherein the conditionally executed portion of the model is at least one of an enabled subsystem, a triggered subsystem, or a control flow subsystem.

17. The method of claim 1 wherein the model includes a textually defined function, the duration operator is bound to the textually defined function, and the elapsed domain is displayed during execution of the model.

18. The method of claim 1 wherein the model is a graphical model, and the duration operator is included in a model element of the graphical model.

19. The method of claim 18 wherein the model element is at least one of a logical operator model element, a relational operator model element, or a duration model element.

20. The method of claim 1 wherein the state machine is represented by a state chart.

21. A non-transitory computer-readable medium comprising program instructions for:
for a model having executable semantics, the model including
either a state machine that includes a state and an action statement or a portion that is conditionally executed,
a domain that increases monotonically during execution of the model, and
a duration operator that includes a conditional expression that evaluates to True or False, wherein the duration operator is either associated with the state or bound to the conditionally executed portion of the model,
during execution of the model, evaluating, by a processor, the conditional expression of the duration operator when either the state becomes active or the conditionally executed portion of the model becomes active;
tracking, by the processor, an elapsing of the domain beginning when the conditional expression associated with the duration operator evaluates to True; and
at least one of
utilizing the elapsed domain in the model, or
displaying the elapsed domain, and wherein
the model simulates a control system, a communication system, or a factory automation system,
code for the model simulates or operates the control system, the communication system, or the factory automation system, and
the inclusion of the duration operator in the model results in the code including fewer lines of code, using fewer memory resources, or using fewer input/output (I/O) resources than corresponding code for the model without including the duration operator.

22. The non-transitory computer-readable medium of claim 21 wherein the domain satisfies one or more properties of a metric including at least one of:
a non-negativity or separation axiom;
an identity of indiscernibles or coincidence axiom;
a symmetry axiom; or
a subadditivity or triangle inequality axiom.

23. The non-transitory computer-readable medium of claim 21 wherein the domain is
a simulation time;
an actual time;
a distance;
an angular rotation; or
a volume.

24. The non-transitory computer-readable medium of claim 23 further comprising program instructions for:
generating code for the model, wherein the generated code for the duration operator is clock-based or counter-based.

25. The non-transitory computer-readable medium of claim 21 wherein the state machine is represented by a state chart.

26. The non-transitory computer-readable medium of claim 21 wherein the model includes a textually defined function, the duration operator is bound to the textually defined function, and the elapsed domain is displayed during execution of the model.

27. An apparatus comprising:
a memory configured to store a model having executable semantics, the model including
either a state machine that includes a state and an action statement or a portion that is conditionally executed,
a domain that increases monotonically during execution of the model, and
a duration operator that includes a conditional expression that evaluates to True or False, wherein the duration operator is either associated with the state or bound to the conditionally executed portion of the model; and
one or more processors coupled to the memory, the one or more processors configured to:
during execution of the model, evaluate the conditional expression of the duration operator when either the state becomes active or the conditionally executed portion of the model becomes active;
track an elapsing of the domain beginning when the conditional expression associated with the duration operator evaluates to True; and
at least one of
utilize the elapsed domain in the model, or
display the elapsed domain, and wherein
the model simulates a control system, a communication system, or a factory automation system,
code for the model simulates or operates the control system, the communication system, or the factory automation system, and
the inclusion of the duration operator in the model results in the code having fewer lines of code, using fewer memory resources, or using fewer input/output (I/O) resources than corresponding code for the model without including the duration operator.

28. The apparatus of claim 27 wherein the monotonically increasing domain is a simulation time over which the model is executed, the one or more processors are further configured to:
determine when the state becomes inactive; and
reset the elapsed simulation time when the state becomes inactive.

29. The apparatus of claim 27 wherein the monotonically increasing domain is a simulation time over which the model is executed, the elapsed simulation time is tracked starting from zero or a previously retained value.

30. The apparatus of claim 27 wherein the one or more processors are further configured to:
generate code for the model, wherein the generated code for the duration operator is clock-based or counter-based, and the generated code includes an operator for incrementing a variable associated with the duration operator.

31. The apparatus of claim 27 wherein the monotonically increasing domain is a simulation time over which the model is executed, and the one or more processors are further configured to:
stop the tracking of elapsed simulation time when the conditional expression associated with the duration operator evaluates to False;
retain a last value of elapsed simulation time when the tracking is stopped; and resume the tracking of elapsed simulation time from the last value when the conditional expression associated with the duration operator next evaluates to True.

\* \* \* \* \*

UNITED STATES PATENT AND TRADEMARK OFFICE
CERTIFICATE OF CORRECTION

PATENT NO. : 10,185,793 B2  
APPLICATION NO. : 15/061556  
DATED : January 22, 2019  
INVENTOR(S) : David B. Andrade et al.

Page 1 of 1

It is certified that error appears in the above-identified patent and that said Letters Patent is hereby corrected as shown below:

In the Specification

Column 4, Line 60 reads:  
"Debounce state's Off sub state 110 to the Off state 102. In"  
Should read:  
--Debounce state's Off substate 110 to the Off state 102. In--

Column 5, Line 10 reads:  
"since activation of the Debounce state's Off sub state 110."  
Should read:  
--since activation of the Debounce state's Off substate 110.--

Column 6, Line 55 reads:  
"els using one or more of the solvers 420a-c. Exemplary"  
Should read:  
--els using one or more of the solvers 418a-c. Exemplary--

Column 15, Line 6 reads:  
"set the variable 'durationRefTime to 1, if the variable"  
Should read:  
--set the variable 'durationRefTime' to 1, if the variable--

Column 24, Line 67 reads:  
"ing the code generator 200. One or more objects or data"  
Should read:  
--ing the code generator 408. One or more objects or data--

Signed and Sealed this  
Twenty-second Day of September, 2020

Andrei Iancu  
*Director of the United States Patent and Trademark Office*